(12) United States Patent
Semmes

(10) Patent No.: US 9,518,163 B2
(45) Date of Patent: Dec. 13, 2016

(54) REINFORCED POLYMER FOAMS, ARTICLES AND COATINGS PREPARED THEREFROM AND METHODS OF MAKING THE SAME

(75) Inventor: Edmund Bernard Semmes, Madison, AL (US)

(73) Assignee: Semmes, Inc., Navarre, FL (US)

( * ) Notice: Subject to any disclaimer, the term of this patent is extended or adjusted under 35 U.S.C. 154(b) by 1223 days.

(21) Appl. No.: 12/471,633

(22) Filed: May 26, 2009

(65) Prior Publication Data

US 2009/0292035 A1 Nov. 26, 2009

Related U.S. Application Data

(60) Provisional application No. 61/056,033, filed on May 26, 2008, provisional application No. 61/092,977, filed on Aug. 29, 2008.

(51) Int. Cl.
*C08J 9/00* (2006.01)
*C08G 101/00* (2006.01)

(52) U.S. Cl.
CPC ............. *C08J 9/0061* (2013.01); *C08J 9/0071* (2013.01); *C08J 9/0076* (2013.01); *C08G 2101/00* (2013.01); *C08J 2477/00* (2013.01)

(58) Field of Classification Search
CPC .................................................... C08J 9/0061
USPC ................................ 428/313.5, 315.5, 317.9
See application file for complete search history.

(56) References Cited

U.S. PATENT DOCUMENTS

| | | | |
|---|---|---|---|
| 2,999,788 A | 9/1961 | Morgan | |
| 3,018,091 A | 1/1962 | Duggins | |
| 3,767,756 A | 10/1973 | Blades | |
| 3,869,429 A | 3/1975 | Blades | |
| 3,869,430 A | 3/1975 | Blades | |
| 4,034,137 A | 7/1977 | Hofer | |
| 4,073,840 A | 2/1978 | Saidla | |
| 4,077,921 A | 3/1978 | Sharpe et al. | |
| 4,160,853 A | 7/1979 | Ammons | |
| 4,377,646 A | 3/1983 | Blount | |
| 4,514,541 A | 4/1985 | Frances | |
| 4,596,736 A * | 6/1986 | Eichhorn et al. | 428/215 |
| 4,692,477 A | 9/1987 | Jacobina | |
| 4,701,475 A | 10/1987 | Turner | |
| 4,857,569 A | 8/1989 | Cotts et al. | |
| 4,861,803 A * | 8/1989 | Turner | 521/37 |
| 4,980,516 A * | 12/1990 | Nakagawa | 174/358 |
| 5,026,456 A | 6/1991 | Hesler et al. | |
| 5,028,372 A * | 7/1991 | Brierre et al. | 264/148 |
| 5,134,016 A | 7/1992 | Geary, Jr. et al. | |
| 5,151,216 A | 9/1992 | Liu | |
| 5,209,877 A | 5/1993 | Frances et al. | |
| 5,331,053 A | 7/1994 | Atkinson et al. | |
| 5,419,139 A | 5/1995 | Blum et al. | |
| 5,474,842 A | 12/1995 | Hoiness | |
| 5,604,266 A | 2/1997 | Mushovic | |
| 6,187,444 B1 | 2/2001 | Bowles, III et al. | |
| 6,414,044 B2 | 7/2002 | Taylor | |
| 6,460,721 B2 | 10/2002 | Bowen et al. | |
| 6,630,221 B1 | 10/2003 | Wong | |
| 6,630,231 B2 | 10/2003 | Perez et al. | |
| 6,727,290 B2 | 4/2004 | Roth | |
| 6,841,584 B2 | 1/2005 | Nutt et al. | |
| 6,890,649 B2 | 5/2005 | Hobbs et al. | |
| 6,924,028 B2 | 8/2005 | Chung et al. | |
| 7,015,274 B2 * | 3/2006 | Chen et al. | 524/538 |
| 7,144,958 B2 | 12/2006 | Chen | |
| 7,229,937 B2 | 6/2007 | Bascom et al. | |
| 7,247,585 B2 | 7/2007 | Bascom et al. | |
| 7,267,288 B2 | 9/2007 | Wheeler, Jr. et al. | |
| 7,297,739 B2 | 11/2007 | Chen et al. | |
| 2002/0094426 A1 | 7/2002 | Stepanian et al. | |
| 2002/0137871 A1 * | 9/2002 | Wheeler et al. | 528/44 |
| 2002/0169227 A1 | 11/2002 | Allen et al. | |
| 2003/0114641 A1 | 6/2003 | Kelly et al. | |
| 2003/0119948 A1 | 6/2003 | Kelly et al. | |
| 2004/0157945 A1 | 8/2004 | Barber | |
| 2004/0254286 A1 | 12/2004 | Hansen et al. | |
| 2004/0256395 A1 | 12/2004 | Lak et al. | |
| 2005/0001100 A1 | 1/2005 | Hsi-Wu et al. | |
| 2005/0267260 A1 | 12/2005 | Frances et al. | |
| 2006/0079651 A1 | 4/2006 | Chen | |
| 2006/0135636 A1 * | 6/2006 | Zhu et al. | 521/172 |
| 2006/0155011 A1 | 7/2006 | Frances et al. | |
| 2007/0196621 A1 * | 8/2007 | Frances et al. | 428/125 |

FOREIGN PATENT DOCUMENTS

| | | |
|---|---|---|
| CA | 2136778 | 5/1996 |
| WO | 2004099474 A2 | 11/2004 |

OTHER PUBLICATIONS

Takei, Takaya et al., "State Analysis of Water in Polyether-Polyol by High-Frequency Spectroscopy", Analytical Sciences, Nov. 1999, pp. 1083-1088, vol. 15.

* cited by examiner

*Primary Examiner* — Irina Krylova
(74) *Attorney, Agent, or Firm* — The Webb Law Firm

(57) ABSTRACT

A cellular foamed article is provided, including a polymeric foam material and a micro- or nano-sized reinforcement material embedded in the foam material. Also, methods of making a reinforced cellular foamed articles are provided, including preparing a dispersion comprising a reinforcement material and a polymer precursor; processing the reinforcement material so that it has a volume average length ranging from about average cross sectional diameter of from about 1 to about 500 nm and a volume average length of from about 10 nm to about 10 μm; reacting the polymer precursor to form a foamable polymer; and foaming the foamable polymer.

1 Claim, 6 Drawing Sheets

REINFORCED POLYMER FOAMS, ARTICLES AND COATINGS PREPARED THEREFROM AND METHODS OF MAKING THE SAME

CROSS REFERENCE TO RELATED APPLICATIONS

This application claims priority to U.S. Provisional Patent Application No. 61/056,033, filed May 26, 2008 and U.S. Provisional Patent Application No. 61/092,977, filed Aug. 29, 2008, the contents of each expressly being incorporated herein by reference.

STATEMENT REGARDING FEDERALLY SPONSORED RESEARCH

The invention described herein was made by employee(s) of the United States Government and may be manufactured and used by or for the Government of the United States of America for governmental purposes without the payment of any royalties thereon or therefore.

BACKGROUND OF THE INVENTION

Field of the Invention

The present invention relates to a method of producing reinforced polymeric cellular solids (foams) and precursor dispersions used in the method as well as articles formed thereby.

Background

Polymer foam systems are utilized in a wide variety of commercial applications, including the roofing, boat building, automotive, medical, aerospace and defense industries. Their light weight, conformability, great insulation qualities, relative high strength and ease of application technique make foam systems a popular choice among designers. However, in aggressive environments these systems have limitations even though basic material characteristics are desired to be deployed. For instance, a more robust urethane foam thermal protection system (TPS) can enhance the functionality of the new Ares I Crew Launch Vehicle (CLV) Upper Stage by providing better margins, better resistance to hail & launch pad debris damage, and reduced boil-off of cryogens for loiter periods on the Ares V follow-on vehicle. Boat builders could reduce laminate thickness, weight and labor costs for hulls with higher strength foam core systems. Use of such materials in roofing applications may provide longer life spans and resistance to damage in high wind areas.

There is a large body of knowledge in the reinforcement of elastomers, such as solid polyurethane elastomers, dating back to the early 1990's. However, very little success can be attributed to these efforts to reinforce flexible and rigid foams with glass, graphite, boron, aramid fibers or mica flakes to enhance their strength and/or flammability. This is primarily the result of not being able to vary chemistries effectively enough to achieve the desired final material qualities, misunderstanding of fiber length effects and functional changes when fibers are added to the raw materials.

Thus, there is a need in the art for reinforced polymeric foams useful in articles having thermal and mechanical properties superior to those found in currently available foam articles.

SUMMARY OF THE INVENTION

In some non-limiting embodiments, the present invention provides a cellular foamed article comprising a polymeric foam material and a micro- or nano-sized reinforcement material embedded in the foam material.

In some non-limiting embodiments, the present invention provides a polymer precursor dispersion for use in making a foamed cellular article that includes at least one polymer precursor, at least one blowing agent, and a reinforcement material, wherein the reinforcement material comprises from about 0.01 to about 50.0 percent by weight based on the total weight of the dispersion. Also provided is a foamed cellular product made using the polymer precursor dispersion and a shaped foam article that is comprised of the foamed cellular product.

In some non-limiting embodiments, the present invention also provides a method of making a reinforced cellular foamed article, comprising the steps of preparing a dispersion comprising a reinforcement material and a polymer precursor, processing the reinforcement material so that it has a volume average length ranging from about average cross sectional diameter of from about 1 to about 500 nm and a volume average length of from about 10 nm to about 10 μm, reacting the polymer precursor to form a foamable polymer, and foaming the foamable polymer.

DETAILED DESCRIPTION

Figure 1:
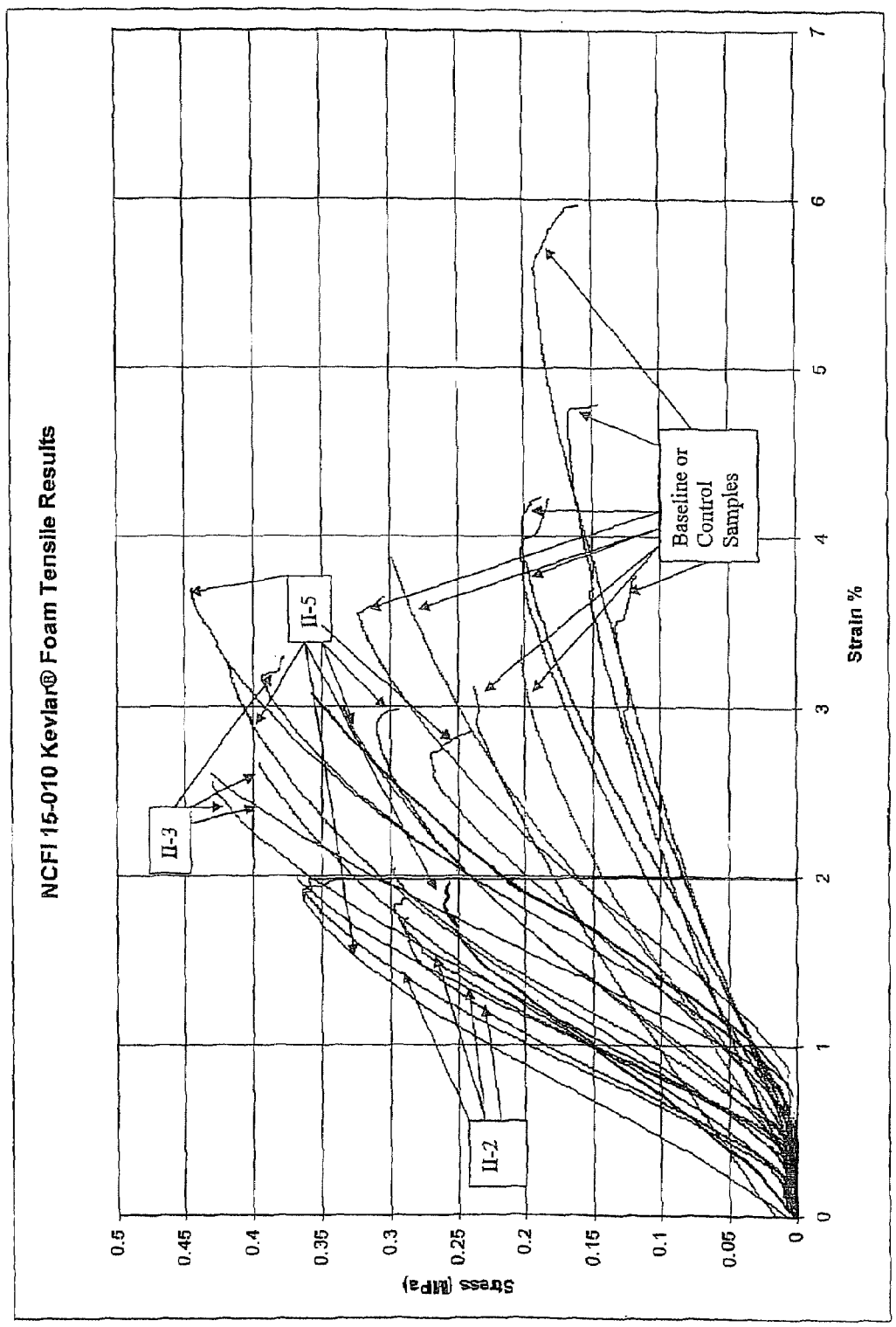
FIG. 1 is a graphical depiction showing the results of the tensile strength testing of a first set of samples according to the present invention.

For the purposes of this specification, unless otherwise indicated, all numbers expressing quantities of ingredients, reaction conditions, dimensions, physical characteristics, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

When any variable (e.g., aryl, heterocycle, $R^2$, etc.) occurs more than one time in any constituent, its definition on each occurrence is independent of its definition at every other occurrence unless otherwise indicated to the contrary.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

The term "optionally substituted" means optional substitution with the specified groups, radicals or moieties.

It should also be noted that any carbon as well as heteroatom with unsatisfied valences in the text, schemes, examples and Tables herein is assumed to have the sufficient number of hydrogen atom(s) to satisfy the valences.

"Alkyl" means an aliphatic hydrocarbon group which may be straight or branched and comprising about 1 to about 20 carbon atoms in the chain. Non-limiting examples of suitable alkyl groups contain about 1 to about 18 carbon atoms in the chain, or about 1 to about 6 carbon atoms in the chain. Branched means that one or more lower alkyl groups such as methyl, ethyl or propyl, are attached to a linear alkyl chain. "Lower alkyl" or "short chain alkyl" means a group having about 1 to about 6 carbon atoms in the chain which may be straight or branched. "Alkyl" may be unsubstituted or optionally substituted by one or more substituents which may be the same or different, each substituent being independently selected from the group consisting of halo, alkyl, aryl, cycloalkyl, cyano, hydroxy, alkoxy, alkylthio, amino, —NH(alkyl), —NH(cycloalkyl), —N(alkyl)$_2$, carboxy and —C(O)O-alkyl. Non-limiting examples of suitable alkyl groups include methyl, ethyl, n-propyl, isopropyl and t-butyl.

"Alkylene" means a difunctional group obtained by removal of a hydrogen atom from an alkyl group that is defined above. Non-limiting examples of alkylene include methylene, ethylene and propylene.

"Aryl" means an aromatic monocyclic or multicyclic ring system comprising about 6 to about 14 carbon atoms, or about 6 to about 10 carbon atoms. The aryl group can be optionally substituted with one or more "ring system substituents" which may be the same or different, and are as defined herein. Non-limiting examples of suitable aryl groups include phenyl and naphthyl.

"Heteroaryl" means an aromatic monocyclic or multicyclic ring system comprising about 5 to about 14 ring atoms, or about 5 to about 10 ring atoms, in which one or more of the ring atoms is an element other than carbon, for example nitrogen, oxygen or sulfur, alone or in combination. In some non-limiting embodiments, the heteroaryls contain about 5 to about 6 ring atoms. The "heteroaryl" can be optionally substituted by one or more "ring system substituents" which may be the same or different, and are as defined herein. The prefix aza, oxa or thia before the heteroaryl root name means that at least one of a nitrogen, oxygen or sulfur atom respectively, is present as a ring atom. A nitrogen atom of a heteroaryl can be optionally oxidized to the corresponding N-oxide. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like.

"Aralkyl" or "arylalkyl" means an aryl-alkyl- group in which the aryl and alkyl are as previously described. In some non-limiting embodiments, the aralkyls comprise a lower alkyl group. Non-limiting examples of suitable aralkyl groups include benzyl, 2-phenethyl and naphthalenylmethyl. The bond to the parent moiety is through the alkyl.

"Alkylaryl" means an alkyl-aryl- group in which the alkyl and aryl are as previously described. In some non-limiting embodiments, the alkylaryls comprise a lower alkyl group. A non-limiting example of a suitable alkylaryl group is tolyl. The bond to the parent moiety is through the aryl.

"Cycloalkyl" means a non-aromatic mono- or multicyclic ring system comprising about 3 to about 10 carbon atoms, or about 5 to about 10 carbon atoms. In some non-limiting embodiments, the cycloalkyl ring contains about 5 to about 7 ring atoms. The cycloalkyl can be optionally substituted with one or more "ring system substituents" which may be the same or different, and are as defined above. Non-limiting examples of suitable monocyclic cycloalkyls include cyclopropyl, cyclopentyl, cyclohexyl, cycloheptyl and the like. Non-limiting examples of suitable multicyclic cycloalkyls include 1-decalinyl, norbornyl, adamantyl and the like.

"Halogen" or "halo" means fluorine, chlorine, bromine, or iodine. In some non-limiting embodiments, the halogen groups are fluorine, chlorine or bromine.

"Ring system substituent" means a substituent attached to an aromatic or non-aromatic ring system which, for example, replaces an available hydrogen on the ring system. Ring system substituents may be the same or different, each being independently selected from the group consisting of alkyl, alkenyl, alkynyl, aryl, heteroaryl, aralkyl, alkylaryl, heteroaralkyl, heteroarylalkenyl, heteroarylalkynyl, alkylheteroaryl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylthio, arylthio, heteroarylthio, aralkylthio, heteroaralkylthio, cycloalkyl, heterocyclyl, —C(=N—CN)—NH$_2$, —C(=NH)—NH$_2$, —C(=NH)—NH(alkyl), Y$_1$Y$_2$N—, Y$_1$Y$_2$N-alkyl-, Y$_1$Y$_2$NC(O)—, Y$_1$Y$_2$NSO$_2$— and —SO$_2$NY$_1$Y$_2$, wherein Y$_1$ and Y$_2$ can be the same or different and are independently selected from the group consisting of hydrogen, alkyl, aryl, cycloalkyl, and aralkyl. "Ring system substituent" may also mean a single moiety which simultaneously replaces two available hydrogens on two adjacent carbon atoms (one H on each carbon) on a ring system. Examples of such moieties are methylene dioxy, ethylenedioxy, —C(CH$_3$)$_2$— and the like which form moieties such as, for example:

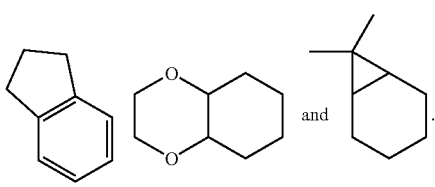

"Heterocyclyl" means a non-aromatic saturated monocyclic or multicyclic ring system comprising about 3 to about 10 ring atoms, or about 5 to about 10 ring atoms, in which one or more of the atoms in the ring system is an element other than carbon, for example nitrogen, oxygen or sulfur, alone or in combination. There are no adjacent oxygen and/or sulfur atoms present in the ring system. In some non-limiting embodiments, the heterocyclyl contains about 5 to about 6 ring atoms. The prefix aza, oxa or thia before the heterocyclyl root name means that at least a nitrogen, oxygen or sulfur atom respectively is present as a ring atom. Any —NH in a heterocyclyl ring may exist protected such as, for example, as an —N(Boc), —N(CBz), —N(Tos) group and the like; such protections are also considered part of this invention. The heterocyclyl can be optionally substituted by one or more "ring system substituents" which may be the same or different, and are as defined herein. The nitrogen or sulfur atom of the heterocyclyl can be optionally oxidized to the corresponding N-oxide, S-oxide or S,S-dioxide. Non-limiting examples of suitable monocyclic heterocyclyl rings include piperidyl, pyrrolidinyl, piperazinyl, morpholinyl, thiomorpholinyl, thiazolidinyl, 1,4-dioxanyl, tetrahydrofuranyl, tetrahydrothiophenyl, lactam, lactone, and the like.

It should also be noted that tautomeric forms such as, for example, the moieties:

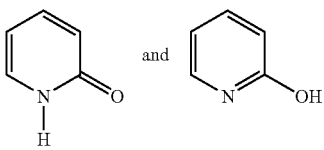 [SMILES: O=c1cccc[nH]1 ; Oc1ccccn1]

are considered equivalent in certain embodiments of this invention.

"Heteroaralkyl" means a heteroaryl-alkyl- group in which the heteroaryl and alkyl are as previously described. In some non-limiting embodiments, the heteroaralkyl contains a lower alkyl group. Non-limiting examples of suitable heteroaralkyl groups include pyridylmethyl, and quinolin-3-ylmethyl. The bond to the parent moiety is through the alkyl.

"Hydroxyalkyl" means a HO-alkyl- group in which alkyl is as previously defined. In some non-limiting embodiments, the hydroxyalkyl contains a lower alkyl group. Non-limiting examples of suitable hydroxyalkyl groups include hydroxymethyl and 2-hydroxyethyl.

"Alkoxy" means an alkyl-O— group in which the alkyl group is as previously described. Non-limiting examples of suitable alkoxy groups include methoxy, ethoxy, n-propoxy, isopropoxy and n-butoxy. The bond to the parent moiety is through the ether oxygen.

"Aryloxy" means an aryl-O— group in which the aryl group is as previously described. Non-limiting examples of suitable aryloxy groups include phenoxy and naphthoxy. The bond to the parent moiety is through the ether oxygen.

"Alkylthio" means an alkyl-S— group in which the alkyl group is as previously described. Non-limiting examples of suitable alkylthio groups include methylthio and ethylthio. The bond to the parent moiety is through the sulfur.

"Arylthio" means an aryl-S— group in which the aryl group is as previously described. Non-limiting examples of suitable arylthio groups include phenylthio and naphthylthio. The bond to the parent moiety is through the sulfur.

"Aralkylthio" means an aralkyl-S— group in which the aralkyl group is as previously described. Non-limiting example of a suitable aralkylthio group is benzylthio. The bond to the parent moiety is through the sulfur.

"Alkoxycarbonyl" means an alkyl-O—CO— group. Non-limiting examples of suitable alkoxycarbonyl groups include methoxycarbonyl and ethoxycarbonyl. The bond to the parent moiety is through the carbonyl.

"Aryloxycarbonyl" means an aryl-O—C(O)— group. Non-limiting examples of suitable aryloxycarbonyl groups include phenoxycarbonyl and naphthoxycarbonyl. The bond to the parent moiety is through the carbonyl.

"Aralkoxycarbonyl" means an aralkyl-O—C(O)— group. A non-limiting example of a suitable aralkoxycarbonyl group is benzyloxycarbonyl. The bond to the parent moiety is through the carbonyl.

"Alkylsulfonyl" means an alkyl-S($O_2$)— group. In some non-limiting embodiments, the alkylsulfonyl group includes a lower alkyl group. The bond to the parent moiety is through the sulfonyl.

"Arylsulfonyl" means an aryl-S($O_2$)— group. The bond to the parent moiety is through the sulfonyl.

As used herein, the term "composition" is intended to encompass a product comprising the specified ingredients in the specified amounts, as well as any product which results, directly or indirectly, from combination of the specified ingredients in the specified amounts.

As used herein, "formed from" or "prepared from" denotes open, e.g., "comprising," claim language. As such, it is intended that a composition "formed from" or "prepared from" a list of recited components be a composition comprising at least these recited components or the reaction product of at least these recited components, and can further comprise other, non-recited components, during the composition's formation or preparation. As used herein, the phrase "reaction product of" means chemical reaction product(s) of the recited components, and can include partial reaction products as well as fully reacted products.

As used herein, the term "equivalent" means the mass in grams of a substance which will react with one mole ($6.022 \times 10^{23}$ electrons) of another substance. As used herein, "equivalent weight" is effectively equal to the amount of a substance in moles, divided by the valence or number of functional reactive groups of the substance.

As used herein, the term "polymer" is meant to encompass oligomers, homopolymers and copolymers.

The phrase "thermoplastic polymer" means a polymer that undergoes liquid flow upon heating and can be soluble in solvents.

The phrase "thermoset polymer" means a polymer that solidifies or "sets" irreversibly upon curing or crosslinking. Once cured, a crosslinked thermoset polymer will not melt upon the application of heat and is generally insoluble in solvents.

As used herein, the term "cure" as used in connection with a composition, e.g., "composition when cured" or a "cured composition", shall mean that any curable or crosslinkable components of the composition are at least partially cured or crosslinked. In some non-limiting embodiments of the present invention, the crosslink density of the crosslinkable components, i.e., the degree of crosslinking, ranges from about 5% to about 100% of complete crosslinking. In other non-limiting embodiments, the crosslink density ranges from about 35% to about 85% of full crosslinking. In other non-limiting embodiments, the crosslink density ranges from about 50% to about 85% of full crosslinking. One skilled in the art will understand that the presence and degree of crosslinking, i.e., the crosslink density, can be determined by a variety of methods, such as dynamic mechanical thermal analysis (DMA) using a TA Instruments DMA 2980 DMA analyzer over a temperature range of −65° F. (−18° C.) to 350° F. (177° C.) conducted under nitrogen according to ASTM D 4065-01. This method determines the glass transition temperature and crosslink density of free films of coatings or polymers. These physical properties of a cured material are related to the structure of the crosslinked network.

Curing of a polymerizable composition can be obtained by subjecting the composition to curing conditions, such as but not limited to thermal curing, irradiation, etc., leading to the reaction of reactive groups of the composition and resulting in polymerization and formation of a solid polymerizate. In some non-limiting embodiments, the polymerizable composition can be subjected to curing conditions until it is at least partially cured. The term "at least partially cured" means subjecting the polymerizable composition to curing conditions, wherein reaction of at least a portion of the reactive groups of the composition occurs, to form a solid polymerizate. The at least partially cured polymerizate can be demolded and, for example, used to prepare articles, cut into test pieces or subjected to machining operations. In some non-limiting embodiments, the polymerizable composition can be subjected to curing conditions such that a substantially complete cure is attained and wherein further exposure to curing conditions results in no significant further improvement in polymer properties, such as strength or hardness.

In some non-limiting embodiments, the present invention provides a polymer precursor dispersion. The polymer precursor dispersion of the present invention comprises at least one polymer precursor. As used herein, the phrase "polymer precursor" means any material, monomer, oligomer, compound, or molecule that is used as a starting material in forming a polymer. Non-limiting examples of polymer precursor component include monomers, reactants, prepolymers, and other materials that are reacted to prepare the polymer or compatible with and can remain in the final polymer.

Obviously, the selected polymer precursor(s) will dictate the composition of the resulting polymer. As understood by those skilled in the art, different polymers can exhibit different properties, with certain properties being more desirable for selected applications. Accordingly, one skilled in the art is readily capable of selecting the appropriate polymer precursors necessary for creating a desired polymer.

Non-limiting examples of useful polymer precursors include those precursors which are used to form polymers such as polyurethanes, poly(ureaurethanes), acrylonitrile butadiene styrene (ABS), acrylic celluloid, cellulose acetate, ethylene-vinyl acetate (EVA), ethylene vinyl alcohol (EVAL), fluoroplastics such as PTFE, FEP, PFA, CTFE, ECTFE, and ETFE, polyacetal (POM), polyacrylates, polyacrylonitrile (PAN or acrylonitrile), polyamide (PA or nylon), polyamide-imide (PAI), polyaryletherketone (PAEK or Ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), cross-linked polyethylene (XPE), polyetheretherketone (PEEK), polyetherimide (PEI, polyethersulfone (PES), polyethylenechlorinates (PEC), polyimide (PI), polylactic acid (PLA), polymethylpentene (PMP), polyphenylene oxide (PPO), polyphenylene sulfide (PPS), polypropylene (PP), polyphthalamide (PPA), polypropylene (PP), polystyrene (PS), polysulfone (PSU), polymethacrylimide (PMI), polyurethane (PU), polyvinyl acetate (PVA), polyvinyl chloride (PVC), polyvinylidene chloride (PVDC), and styrene-acrylonitrile (SAN) as well as other epoxies, phenols and ureas.

For instance, some suitable polymer precursors include monomers of styrene, (to make polystyrene), propylene (to make polypropylene), amide (to make polyamide), imide (to make polyimide), vinyl chloride (to make PVC), bisphenol A (to make polycarbonate), etc.

In some non-limiting embodiments, the selected polymer precursors include those precursors which are used to form polyurethane polymers. For purposes of this application, the term "polyurethane" is intended to include not only polyurethanes that are formed from the reaction of isocyanates and polyols, but also poly(ureaurethanes) that are prepared from the reaction of isocyanates with polyols and water and/or polyamines. Polyurethane polymers can be used to form articles having a wide range of density, stiffness, and hardness, including foamed articles, soft-solid elastomers, and hard-solid plastics. Foamed (or foamable) polyurethane articles (or polymers) are of particular focus in this invention. Foamed polyurethane articles are broadly categorized into flexible and rigid foams. Generally speaking, the addition polymerization of diisocyanates with macroglycols to produce foamable polyurethanes and the versatility of the polyaddition process facilitates a wide spectrum of foam products within these two broad categories in closed cell and open cell foams. The macroglycols (also referred to as polyols) can be based on polyethers, polyesters or a combination of both. Higher functional monomers (more moieties within the chemical structure) can be utilized to create branched or cross-linked thermoset polymers characteristic in rigid foams. In addition to linear thermoplasticity and cross-linked thermosets, trimerization of part of the isocyanate groups results in the formation of rigid polyurethane modified isocyanurate (PUIR) foams exhibiting superior thermal stability and combustibility characteristics.

As alluded to above, in some non-limiting embodiments for preparing a polymer precursor dispersion useful in forming polyurethanes and foams thereof, suitable polymer precursors include, but are not limited to, isocyanate(s) and/or polyol(s).

As used herein, the term "isocyanate" includes compounds, monomers, oligomers and polymers comprising at least one or at least two —N═C═O functional groups and/or at least one or at least two —N═C═S (isothiocyanate) groups. Monofunctional isocyanates can be used as chain terminators or to provide terminal groups during polymerization. As used herein, "polyisocyanate" means an isocyanate comprising at least two —N═C═O functional groups and/or at least two —N═C═S (isothiocyanate) groups, such as diisocyanates or triisocyanates, as well as dimers and trimers or biurets of the isocyanates discussed herein. Suitable isocyanates are capable of forming a covalent bond with a reactive group such as hydroxyl, thiol or amine functional group.

Isocyanates useful in the present invention can be branched or unbranched. As used herein, "branched" means a chain of atoms with one or more side chains attached to it. Branching occurs by the replacement of a substituent, e.g., a hydrogen atom, with a covalently bonded substituent or moiety, e.g, an alkyl group.

Isocyanates useful in the present invention include "modified", "unmodified" and mixtures of "modified" and "unmodified" isocyanates. The isocyanates can have "free", "blocked" or partially blocked isocyanate groups. The term "modified" means that the aforementioned isocyanates are changed in a known manner to introduce biuret, urea, carbodiimide, urethane or isocyanurate groups or blocking groups. In some non-limiting embodiments, the "modified" isocyanate is obtained by cycloaddition processes to yield dimers and trimers of the isocyanate, i.e., polyisocyanates. Free isocyanate groups are extremely reactive. In order to control the reactivity of isocyanate group-containing components, the NCO groups may be blocked with certain selected organic compounds that render the isocyanate group inert to reactive hydrogen compounds at room temperature. When heated to elevated temperatures, e.g., ranging from about 90° C. to about 200° C., the blocked isocyanates release the blocking agent and react in the same way as the original unblocked or free isocyanate.

Generally, compounds used to block isocyanates are organic compounds that have active hydrogen atoms, e.g., volatile alcohols, epsilon-caprolactam or ketoxime compounds. Non-limiting examples of suitable blocking compounds include phenol, cresol, nonylphenol, epsilon-caprolactam and methyl ethyl ketoxime.

As used herein, the NCO in the NCO:OH ratio represents the free isocyanate of free isocyanate-containing materials, and of blocked or partially blocked isocyanate-containing materials after the release of the blocking agent. In some cases, it is not possible to remove all of the blocking agent. In those situations, more of the blocked isocyanate-containing material would be used to attain the desired level of free NCO.

The molecular weight of the isocyanate and isothiocyanate can vary widely. In some non-limiting embodiments, the number average molecular weight (Mn) of each can be at least about 100 grams/mole, or at least about 150 grams/mole, or less than about 15,000 grams/mole, or less than about 5,000 grams/mole. The number average molecular weight can be determined using known methods, such as by gel permeation chromatography (GPC) using polystyrene standards.

Non-limiting examples of suitable isocyanates include aliphatic, cycloaliphatic, aromatic and heterocyclic isocyanates, dimers and trimers thereof and mixtures thereof.

Non-limiting examples of suitable aliphatic isocyanates include straight chain isocyanates such as ethylene diisocyanate, trimethylene diisocyanate, 1,6-hexamethylene diisocyanate (HDI), tetramethylene diisocyanate, hexamethylene diisocyanate, octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, bis(isocyanatoethyl)ether.

Other non-limiting examples of suitable aliphatic isocyanates include branched isocyanates such as trimethylhexane diisocyanate, trimethylhexamethylene diisocyanate (TMDI), 2,2'-dimethylpentane diisocyanate, 2,2,4-trimethylhexane diisocyanate, 2,4,4,-trimethylhexamethylene diisocyanate, 1,8-diisocyanato-4-(isocyanatomethyl)octane, 2,5,7-trimethyl-1,8-diisocyanato-5-(isocyanatomethyl) octane, 2-isocyanatopropyl-2,6-diisocyanatohexanoate, lysinediisocyanate methyl ester and lysinetriisocyanate methyl ester.

Non-limiting examples of suitable cycloaliphatic isocyanates include dinuclear compounds bridged by an isopropylidene group or an alkylene group of 1 to 3 carbon atoms. Non-limiting examples of suitable cycloaliphatic isocyanates include 1,1'-methylene-bis-(4-isocyanatocyclohexane) or 4,4'-methylene-bis-(cyclohexyl isocyanate) (such as DESMODUR W commercially available from Bayer Corp. of Pittsburgh, Pa.), 4,4'-isopropylidene-bis-(cyclohexyl isocyanate), 1,4-cyclohexyl diisocyanate (CHDI), 4,4'-dicyclohexylmethane diisocyanate, 3-isocyanato methyl-3,5,5-trimethylcyclohexyl isocyanate (a branched isocyanate also known as isophorone diisocyanate or IPDI which is commercially available from Arco Chemical Co. of Newtown Square, Pa. and meta-tetramethylxylylene diisocyanate (a branched isocyanate also known as 1,3-bis(1-isocyanato-1-methylethyl)-benzene which is commercially available from Cytec Industries Inc. of West Patterson, N.J. under the tradename TMXDI® (Meta) Aliphatic Isocyanate) and mixtures thereof.

Other useful dinuclear cycloaliphatic diisocyanates include those formed through an alkylene group of from 1 to 3 carbon atoms inclusive, and which can be substituted with nitro, chlorine, alkyl, alkoxy and other groups that are not reactive with hydroxyl groups (or active hydrogens) providing they are not positioned so as to render the isocyanate group unreactive. Also, hydrogenated aromatic diisocyanates such as hydrogenated toluene diisocyanate may be used. Dinuclear diisocyanates in which one of the rings is saturated and the other unsaturated, which are prepared by partially hydrogenating aromatic diisocyanates such as diphenyl methane diisocyanates, diphenyl isopropylidene diisocyanate and diphenylene diisocyanate, may also be used.

Mixtures of cycloaliphatic diisocyanates with aliphatic diisocyanates and/or aromatic diisocyanates may also be used. An example is 4,4'-methylene-bis-(cyclohexyl isocyanate) with commercial isomer mixtures of toluene diisocyanate or meta-phenylene diisocyanate.

Thioisocyanates corresponding to the above diisocyanates can be used, as well as mixed compounds containing both an isocyanate and a thioisocyanate group.

Other non-limiting examples of suitable polyisocyanates for use in the present invention include polyisocyanates and polyisothiocyanates having backbone linkages such as urethane linkages (—NH—C(O)—O—), thiourethane linkages (—NH—C(O)—S—), thiocarbamate linkages (—NH—C(S)—O—), dithiourethane linkages (—NH—C(S)—S—), polyamide linkages, and combinations thereof.

Other non-limiting examples of suitable polyisocyanates include ethylenically unsaturated polyisocyanates and polyisothiocyanates; alicyclic polyisocyanates and polyisothiocyanates; aromatic polyisocyanates and polyisothiocyanates wherein the isocyanate groups are not bonded directly to the aromatic ring, e.g., α,α'-xylylene diisocyanate; aromatic polyisocyanates and polyisothiocyanates wherein the isocyanate groups are bonded directly to the aromatic ring, e.g., benzene diisocyanate; aliphatic polyisocyanates and polyisothiocyanates containing sulfide linkages; aromatic polyisocyanates and polyisothiocyanates containing sulfide or disulfide linkages; aromatic polyisocyanates and polyisothiocyanates containing sulfone linkages; sulfonic ester-type polyisocyanates and polyisothiocyanates, e.g., 4-methyl-3-isocyanatobenzenesulfonyl-4'-isocyanato-phenol ester; aromatic sulfonic amide-type polyisocyanates and polyisothiocyanates; sulfur-containing heterocyclic polyisocyanates and polyisothiocyanates, e.g., thiophene-2,5-diisocyanate; halogenated, alkylated, alkoxylated, nitrated, carbodiimide modified, urea modified and biuret modified derivatives of isocyanates; and dimerized and trimerized products of isocyanates.

Non-limiting examples of suitable ethylenically unsaturated polyisocyanates include butene diisocyanate and 1,3-butadiene-1,4-diisocyanate. Non-limiting examples of suitable alicyclic polyisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Non-limiting examples of suitable aromatic polyisocyanates wherein the isocyanate groups are not bonded directly to the aromatic ring include α,α'-xylene diisocyanate, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl) naphthalene, bis(isocyanatomethyl)diphenyl ether, bis(isocyanatoethyl) phthalate, mesitylene triisocyanate and 2,5-di(isocyanatomethyl)furan.

Non-limiting examples of suitable aromatic polyisocyanates having isocyanate groups bonded directly to the aromatic ring include methylene diphenyl diisocyanate (MDI), phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene diisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Non-limiting examples of suitable aliphatic polyisocyanates containing sulfide linkages include thiodiethyl diisocyanate, thiodipropyl diisocyanate, dithiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate. Non-limiting examples of aromatic polyisocyanates containing sulfide or disulfide linkages include but are not limited to diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

Non-limiting examples of suitable aromatic polyisocyanates containing sulfone linkages include diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Non-limiting examples of aromatic sulfonic amide-type polyisocyanates include 4-methyl-3-isocyanato-benzene-sulfonylanilide-3'-methyl-4'-isocyanate, dibenzenesulfonyl-ethylenediamine-4,4'-diisocyanate, 4,4'-methoxybenzene-sulfonyl-ethylenediamine-3,3'-diisocyanate and 4-methyl-3-isocyanato-benzene-sulfonylanilide-4-ethyl-3'-isocyanate.

Non-limiting examples of suitable isothiocyanates include cyclohexane diisothiocyanates; aromatic isothiocyanates wherein the isothiocyanate group(s) are not bonded directly to the aromatic ring; aromatic isothiocyanates wherein the isothiocyanate group(s) are bonded directly to the aromatic ring; heterocyclic isothiocyanates; carbonyl polyisothiocyanates; aliphatic polyisothiocyanates containing sulfide linkages; and mixtures thereof.

Other non-limiting examples of suitable isothiocyanates include aromatic polyisothiocyanates wherein the isothiocyanate groups are bonded directly to the aromatic ring, such as phenylene diisothiocyanate; heterocyclic polyisothiocyanates, such as 2,4,6-triisothicyanato-1,3,5-triazine and thiophene-2,5-diisothiocyanate; carbonyl polyisothiocyanates; aliphatic polyisothiocyanates containing sulfide linkages, such as thiobis(3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of these polyisothiocyanates; and dimerized and trimerized products of these isothiocyanates.

Non-limiting examples of suitable aliphatic polyisothiocyanates include 1,2-diisothiocyanatoethane, 1,3-diisothiocyanatopropane, 1,4-diisothiocyanatobutane and 1,6-diisothiocyanatohexane. Non-limiting examples of aromatic polyisothiocyanates having isothiocyanate groups bonded directly to the aromatic ring include 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'-diisothiocyanatobenzophenenone, 4,4'-diisothiocyanato-3,3'-dimethylbenzophenone, benzanilide-3,4'-diisothiocyanate, diphenylether-4,4'-diisothiocyanate and diphenylamine-4,4'-diisothiocyanate.

Non-limiting examples of suitable carbonyl isothiocyanates include hexane-dioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate. Non-limiting examples of suitable aromatic polyisothiocyanates containing sulfur atoms in addition to those of the isothiocyanate groups, include 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothiocyanate.

Other non-limiting examples of isocyanates having isocyanate and isothiocyanate groups include materials having aliphatic, alicyclic, aromatic or heterocyclic groups and which optionally can contain sulfur atoms in addition to those of the isothiocyanate groups. Non-limiting examples of such materials include 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

In some non-limiting embodiments, the isocyanate comprises at least one triisocyanate or at least one polyisocyanate trimer or at least one isocyanurate. Non-limiting examples of such isocyanates include aromatic triisocyanates such as tris(4-iso-cyanatophenyl)methane (DESMODUR R), 1,3,5-tris(3-isocyanato-4-methylphenyl)-2,3,6-trioxohexahydro-1,3,5 triazine (DESMODUR IL); adducts of aromatic diisocyanates such as the adduct of 2,4-tolylene diisocyanate (TDI, 2,4-diisocyanatotoluene) and trimethylolpropane (DESMODUR L); and from aliphatic triisocyanates such as N-isocyanatohexylaminocarbonyl-N,N'-bis (isocyanatohexyl)urea (DESMODUR N), 2,4,6-trioxo-1,3,5-tris(6-isocyanatohexyl)hexahydro-1,3,5-triazine (DESMODUR N3390), 2,4,6-trioxo-1,3,5-tris(5-isocyanato-1,3,3-trimethylcyclo-hexylmethyl)hexahydro-1,3,5-triazine (DESMODUR Z4370), and 4-(isocyanatomethyl)-1,8-octane diisocyanate. The above DESMODUR products are commercially available from Bayer Corp. Also useful are the biuret of hexanediisocyanate, polymeric methane diisocyanate, and polymeric isophorone diisocyanate. Trimers of hexamethylene diisocyanate, isophorone diisocyanate and tetramethylxylylene diisocyanate are also included.

In some non-limiting embodiments, a polyisocyanate used to make a polyurethane polyol prepolymer as a polymer precursor can be a cycloaliphatic compound, such as a dinuclear compound bridged by an isopropylidene group or an alkylene group of 1 to 3 carbon atoms.

The reaction components for preparing the polyurethane can comprise about 0.1 to about 1.5 equivalents of polyol per one equivalent of polyisocyanate. Non-limiting examples of suitable polyols include diols, triols and/or higher functional polyols.

As used herein, the term "polyol" includes compounds, monomers, oligomers and polymers comprising at least two hydroxyl groups (such as diols) or at least three hydroxyl groups (such as triols), higher functional polyols and mixtures thereof. Suitable polyols are capable of forming a covalent bond with a reactive group such as an isocyanate functional group. Non-limiting examples of suitable polyols include aliphatic, cycloaliphatic, aromatic, heterocyclic, oligomeric, and polymeric polyols and mixtures thereof.

In some non-limiting embodiments, the polyol can comprise polyester polyol(s) and/or polyether polyol(s). Non-limiting examples of suitable polyester polyols include polyester glycols, polycaprolactone polyols, polycarbonate polyols and mixtures thereof. Polyester glycols can include the esterification products of one or more dicarboxylic acids having from four to ten carbon atoms, such as but not limited to adipic, succinic or sebacic acids, with one or more low molecular weight glycols having from two to ten carbon atoms, such as but not limited to ethylene glycol, propylene glycol, diethylene glycol, 1,4-butanediol, neopentyl glycol, 1,6-hexanediol and 1,10-decanediol.

Non-limiting examples of polycaprolactone polyols include those prepared by condensing caprolactone in the presence of difunctional active hydrogen material such as water or low molecular weight glycols, for example ethylene glycol and propylene glycol. Non-limiting examples of suitable polycaprolactone polyols can include commercially available materials designated as the CAPA series from Solvay Chemical of Houston, Tex. such as CAPA 2047A and CAPA 2077A, and the TONE series from Dow Chemical of Midland, Mich. such as TONE 0201, 0210, 0230 & 0241. In some non-limiting embodiments, the polycaprolactone polyol has a molecular weight ranging from about 500 to about 2000 grams per mole, or about 500 to about 1000 grams per mole.

Non-limiting examples of polycarbonate polyols include aliphatic polycarbonate diols, for example those based upon alkylene glycols, ether glycols, alicyclic glycols or mixtures thereof. In some embodiments, the alkylene groups for preparing the polycarbonate polyol can comprise from 5 to 10 carbon atoms and can be straight chain, cycloalkylene or combinations thereof. Non-limiting examples of such alkylene groups include hexylene, octylene, decylene, cyclohexylene and cyclohexyldimethylene. Suitable polycarbonate polyols can be prepared, in non-limiting examples, by reacting a hydroxy terminated alkylene glycol with a dialkyl carbonate, such as methyl, ethyl, n-propyl or n-butyl carbonate, or diaryl carbonate, such as diphenyl or dinaphthyl carbonate, or by reacting of a hydroxy-terminated alkylene diol with phosgene or bischoloroformate, in a manner well known to those skilled in the art. Non-limiting examples of such polycarbonate polyols include those commercially available as Ravecarb™ 107 from Enichem S.p.A. (Polimeri Europa) of Italy and polyhexylene carbonate diols, about 1000 number average molecular weight, such as KM10-1733 polycarbonate diol prepared from hexanediol, available from Stahl. Examples of other suitable polycarbonate polyols that are commercially available include KM10-1122, KM10-1667 (prepared from a 50/50 weight percent mixture of cyclohexane dimethanol and hexanediol) (commercially available from Stahl U.S.A. Inc. of Peabody, Mass.) and DESMOPHEN 2020E (commercially available from Bayer Corp).

The polycarbonate polyol can be produced by reacting diol, such as described herein, and a dialkyl carbonate, such as described in U.S. Pat. No. 4,160,853. The polycarbonate polyol can include polyhexamethylene carbonate such as $HO-(CH_2)_6-[O-C(O)-O-(CH_2)_6]_1-OH$, wherein n is an integer from 4 to 24, or from 4 to 10, or from 5 to 7.

Non-limiting examples of polyether polyols include poly (oxyalkylene) polyols or polyalkoxylated polyols. Poly(oxyalkylene) polyols can be prepared in accordance with known methods. In a non-limiting embodiment, a poly(oxyalkylene) polyol can be prepared by condensing an alkylene oxide, or a mixture of alkylene oxides, using acid- or base-catalyzed addition with a polyhydric initiator or a mixture of polyhydric initiators, such as ethylene glycol, propylene glycol, glycerol, and sorbitol. Compatible mixtures of polyether polyols can also be used. As used herein, "compatible" means that two or more materials are mutually soluble in each other so as to essentially form a single phase. Non-limiting examples of alkylene oxides can include ethylene oxide, propylene oxide, butylene oxide, amylene oxide, aralkylene oxides, such as styrene oxide, mixtures of ethylene oxide and propylene oxide. In some non-limiting embodiments, polyoxyalkylene polyols can be prepared with mixtures of alkylene oxide using random or step-wise oxyalkylation. Non-limiting examples of such poly(oxyalkylene) polyols include polyoxyethylene polyols, such as polyethylene glycol, and polyoxypropylene polyols, such as polypropylene glycol.

Other polyether polyols include block polymers such as those having blocks of ethylene oxide-propylene oxide and/or ethylene oxide-butylene oxide. In some non-limiting embodiments, the polyether polyol comprises a block copolymer of the following formula:

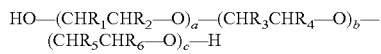

wherein $R_1$ through $R_6$ can each independently represent hydrogen or methyl; and a, b, and c can each be independently selected from an integer from 0 to 300, wherein a, b and c are selected such that the number average molecular weight of the polyol is less than about 32,000 grams/mole, or less than about 10,000 grams/mole, as determined by GPC.

In some non-limiting embodiments, polyalkoxylated polyols can be represented by the following general formula:

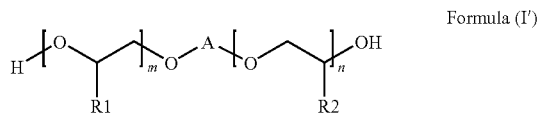

Formula (I')

wherein m and n can each be a positive integer, the sum of m and n being from 5 to 70; R1 and R2 are each hydrogen, methyl or ethyl; and A is a divalent linking group such as a straight or branched chain alkylene which can contain from 1 to 8 carbon atoms, phenylene, and $C_1$ to $C_9$ alkyl-substituted phenylene. The values of m and n can, in combination with the selected divalent linking group, determine the molecular weight of the polyol. Polyalkoxylated polyols can be prepared by methods that are known in the art. In a non-limiting embodiment, a polyol such as 4,4'-isopropylidenediphenol can be reacted with an oxirane-containing material such as ethylene oxide, propylene oxide or butylene oxide, to form what is commonly referred to as an ethoxylated, propoxylated or butoxylated polyol having hydroxyl functionality. Non-limiting examples of polyols suitable for use in preparing polyalkoxylated polyols can include those polyols described in U.S. Pat. No. 6,187,444 B1 at column 10, lines 1-20, incorporated herein by reference.

In some non-limiting embodiments, the polyether polyol can be PLURONIC ethylene oxide/propylene oxide block copolymers, such as PLURONIC R and PLURONIC L62D, and/or TETRONIC tetra-functional block copolymers based on ethylene oxide and propylene oxide, such as TETRONIC R, which are commercially available from BASF Corp. of Parsippany, N.J.

As used herein, the phrase "polyether polyols" also can include poly(oxytetramethylene) diols prepared by the polymerization of tetrahydrofuran in the presence of Lewis acid catalysts such as but not limited to boron trifluoride, tin (IV) chloride and sulfonyl chloride.

Non-limiting examples of suitable diols for use as polyols in the present invention include straight chain alkane diols such as ethylene glycol, diethylene glycol, triethylene glycol, tetraethylene glycol, 1,2-ethanediol, propane diols such as 1,2-propanediol and 1,3-propanediol, butane diols such as 1,2-butanediol, 1,3-butanediol, and 1,4-butanediol, pentane diols such as 1,5-pentanediol, 1,3-pentanediol and 2,4-pentanediol, hexane diols such as 1,6-hexanediol and 2,5-hexanediol, heptane diols such as 2,4-heptanediol, octane diols such as 1,8-octanediol, nonane diols such as 1,9-nonanediol, decane diols such as 1,10-decanediol, dodecane diols such as 1,12-dodecanediol, octadecanediols such as 1,18-octadecanediol, sorbitol, mannitol, and mixtures thereof. In some non-limiting embodiments, the diol is a propane diol such as 1,2-propanediol and 1,3-propanediol, or butane diol such as 1,2-butanediol, 1,3-butanediol, and 1,4-butanediol. In some non-limiting embodiments, one or more carbon atoms in the polyol can be replaced with one or more heteroatoms, such as N, S, or O, for example sulfonated polyols, such as dithio-octane bis diol, thiodiethanol such as 2,2-thiodiethanol, or 3,6-dithia-1,2-octanediol.

Other non-limiting examples of suitable diols include those represented by the following formula:

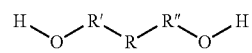

wherein R represents $C_0$ to $C_{18}$ divalent linear or branched aliphatic, cycloaliphatic, aromatic, heterocyclic, or oligomeric saturated alkylene radical or mixtures thereof; $C_2$ to $C_{18}$ divalent organic radical containing at least one element selected from the group consisting of sulfur, oxygen and silicon in addition to carbon and hydrogen atoms; $C_5$ to $C_{18}$ divalent saturated cycloalkylene radical; or $C_5$ to $C_{18}$ divalent saturated heterocycloalkylene radical; and R' and R" can be present or absent and, if present, each independently represent $C_1$ to $C_{18}$ divalent linear or branched aliphatic, cycloaliphatic, aromatic, heterocyclic, polymeric, or oligomeric saturated alkylene radical or mixtures thereof.

Other non-limiting examples of suitable diols include branched chain alkane diols, such as propylene glycol, dipropylene glycol, tripropylene glycol, neopentyl glycol, 2-methyl-butanediol. 2,2,4-trimethyl-1,3-pentanediol, 2-methyl-1,3-pentanediol, 2-ethyl-1,3-hexanediol, 2-methyl-1,3-propanediol, 2,2-dimethyl-1,3-propanediol, dibutyl 1,3-propanediol, polyalkylene glycols such as polyethylene glycols, and mixtures thereof.

In some non-limiting embodiments, the diol can be a cycloalkane diol, such as cyclopentanediol, 1,4-cyclohexanediol, cyclohexanedimethanols (CHDM), such as 1,4-cyclohexanedimethanol, cyclododecanediol, 4,4'-isopropylidene-biscyclohexanol, hydroxypropylcyclohexanol, cyclohexanediethanol, 1,2-bis(hydroxymethyl)-cyclohexane, 1,2-bis(hydroxyethyl)-cyclohexane, 4,4'-isopropylidene-biscyclohexanol, bis(4-hydroxycyclohexanol)methane and mixtures thereof.

In some non-limiting embodiments, the diol can be an aromatic diol, such as dihydroxybenzene, 1,4-benzenedimethanol, xylene glycol, hydroxybenzyl alcohol and dihydroxytoluene; bisphenols, such as, 4,4'-isopropylidenediphenol, 4,4'-oxybisphenol, 4,4'-dihydroxybenzophenone, 4,4'-thiobisphenol, phenolphthalein, bis(4-hydroxyphenyl) methane, 4,4'-(1,2-ethenediyl)bisphenol and 4,4'-sulfonylbisphenol; halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, which can have, for example, ethoxy, propoxy, α-butoxy and β-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol) methane, the alkoxylation product of 1 mole of 2,2-bis(4-hydroxyphenyl)propane (i.e., bisphenol-A) and 2 moles of propylene oxide, hydroxyalkyl terephthalates such as meta or para bis(2-hydroxyethyl) terephthalate, bis(hydroxyethyl) hydroquinone and mixtures thereof.

In some non-limiting embodiments, the diol can be an heterocyclic diol, for example a dihydroxy piperidine such as 1,4-bis(hydroxyethyl)piperazine.

In some non-limiting embodiments, the diol can be a diol of an amide or alkane amide (such as ethanediamide (oxamide)), for example N,N',bis(2-hydroxyethyl)oxamide.

In some non-limiting embodiments, the diol can be a diol of an isocyanurate, such as dihydroxyethyl isocyanurate.

In some non-limiting embodiments, the diol can be an SH-containing material, such as polythiols having at least three thiol groups and 4 to 18 carbon atoms. Non-limiting examples of suitable polythiols can include but are not limited to aliphatic polythiols, cycloaliphatic polythiols, aromatic polythiols, heterocyclic polythiols, polymeric polythiols, oligomeric polythiols and mixtures thereof. The sulfur-containing active hydrogen-containing material can have linkages including but not limited to ether linkages (—O—), sulfide linkages (—S—), polysulfide linkages (—S$_x$—, wherein x is at least 2, or from 2 to 4) and combinations of such linkages. As used herein, the terms "thiol," "thiol group," "mercapto" or "mercapto group" refer to an —SH group which is capable of forming a thiourethane linkage, (i.e., —NH—C(O)—S—) with an isocyanate group or a dithioruethane linkage (i.e., —NH—C(S)—S—) with an isothiocyanate group.

In some non-limiting embodiments, the diol can have a number average molecular weight of about 200 to about 10,000 grams/mole, or less than about 500 grams/mole, or less than about 200 grams/mole.

In some non-limiting embodiments, the reaction components for preparing the polyurethane can further comprise one or more triols and/or one or more higher functional polyols.

Non-limiting examples of trifunctional, tetrafunctional or higher polyols suitable for use as the polyol include branched chain alkane polyols such as glycerol or glycerin, tetramethylolmethane, trimethylolethane (for example 1,1,1-trimethylolethane), trimethylolpropane (TMP) (for example 1,1,1-trimethylolpropane), erythritol, pentaerythritol, dipentaerythritol, tripentaerythritol, sorbitan, alkoxylated derivatives thereof (discussed below) and mixtures thereof.

In some non-limiting embodiments, the polyol can be a cycloalkane polyol, such as trimethylene bis(1,3,5-cyclohexanetriol).

In some non-limiting embodiments, the polyol can be an aromatic polyol, such as trimethylene bis(1,3,5-benzenetriol).

Further non-limiting examples of suitable polyols include the aforementioned polyols which can be alkoxylated derivatives, such as ethoxylated, propoxylated and butoxylated. In alternate non-limiting embodiments, the following polyols can be alkoxylated with from 1 to 10 alkoxy groups: glycerol, trimethylolethane, trimethylolpropane, benzenetriol, cyclohexanetriol, erythritol, pentaerythritol, sorbitol, mannitol, sorbitan, dipentaerythritol and tripentaerythritol. In alternate non-limiting embodiments, alkoxylated, ethoxylated and propoxylated polyols and mixtures thereof can be used alone or in combination with unalkoxylated, unethoxylated and unpropoxylated polyols having at least three hydroxyl groups and mixtures thereof. The number of alkoxy groups can be from 1 to 10, or from 2 to 8 or any rational number between 1 and 10. In a non-limiting embodiment, the alkoxy group can be ethoxy and the number of ethoxy groups can be 1 to 5 units. In another non-limiting embodiment, the polyol can be trimethylolpropane having up to 2 ethoxy groups. Non-limiting examples of suitable alkoxylated polyols include ethoxylated trimethylolpropane, propoxylated trimethylolpropane, ethoxylated trimethylolethane, and mixtures thereof.

Non-limiting examples of suitable non-branched triols and non-branched higher functional polyols include aliphatic, cycloaliphatic, aromatic, heterocyclic, oligomeric and polymeric polyols and mixtures thereof.

In some non-limiting embodiments, the polyol can be a cycloalkane polyol, such as cyclohexanetriol (for example 1,3,5-cyclohexanetriol).

In some non-limiting embodiments, the polyol can be an aromatic polyol, such as benzenetriol (for example 1,2,3-benzenetriol, 1,2,4-benzenetriol, and 1,3,5-benzenetriol) and phenolphthalein.

In some non-limiting embodiments, the polyol can be a polyol of an isocyanurate, such as tris hydroxyethyl isocyanurate.

Non-limiting examples of suitable polyols having more than 18 carbon atoms include straight or branched chain aliphatic polyols, cycloaliphatic polyols, cycloaliphatic polyols, aromatic polyols, heterocyclic polyols, oligomeric polyols, polymeric polyols and mixtures thereof.

Non-limiting examples of suitable straight or branched chain aliphatic polyols having more than 18 carbon atoms include 1,18-icosanediol and 1,24-tetracosanediol.

Other non-limiting examples of suitable polyols having more than 18 carbon atoms include those represented by the following formula:

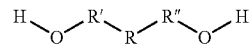

wherein R represents $C_0$ to $C_{30}$ divalent linear or branched aliphatic, cycloaliphatic, aromatic, heterocyclic, or oligomeric saturated alkylene radical or mixtures thereof, $C_2$ to $C_{30}$ divalent organic radical containing at least one element selected from the group consisting of sulfur, oxygen and silicon in addition to carbon and hydrogen atoms; $C_5$ to $C_{30}$ divalent saturated cycloalkylene radical; or $C_5$ to $C_{30}$ divalent saturated heterocycloalkylene radical; and R' and R" can be present or absent and, if present, each independently represent $C_1$ to $C_{30}$ divalent linear or branched aliphatic, cycloaliphatic, aromatic, heterocyclic, polymeric, or oligomeric saturated alkylene radical or mixtures thereof.

Non-limiting examples of suitable cycloaliphatic polyols having more than 18 carbon atoms include biscyclohexanols having more than 18 carbon atoms, which can be prepared by hydrogenating the corresponding bisphenols.

Non-limiting examples of suitable aromatic polyols having more than 18 carbon atoms include bisphenols, alkoxylated bisphenols, such as alkoxylated 4,4'-isopropylidenediphenol which can have from 3 to 70 alkoxy groups, and Other non-limiting examples of suitable oligomeric or polymeric polyols having more than 18 carbon atoms include higher polyalkylene glycols such as polyethylene glycols having number average molecular weights ranging from about 200 grams/mole to about 2,000 grams/mole, and mixtures thereof.

In some non-limiting embodiments, the polyol for use in the present invention can be an SH-containing material, such as polythiols having at least two thiol groups or at least three thiol groups and at least 18 carbon atoms. Non-limiting examples of suitable polythiols can include but are not limited to aliphatic polythiols, cycloaliphatic polythiols, aromatic polythiols, heterocyclic polythiols, polymeric polythiols, oligomeric polythiols and mixtures thereof. The sulfur-containing active hydrogen-containing material can have linkages including but not limited to ether linkages (—O—), sulfide linkages (—S—), polysulfide linkages (—$S_x$—, wherein x is at least 2, or from 2 to 4) and combinations of such linkages. As used herein, the terms "thiol," "thiol group," "mercapto" or "mercapto group" refer to an —SH group which is capable of forming a thiourethane linkage, (i.e., —NH—C(O)—S—) with an isocyanate group or a dithiouretane linkage (i.e., —NH—C(S)—S—) with an isothiocyanate group.

In some non-limiting embodiments, the components of the polyurethane are essentially free of SH-containing materials, e.g., contain less than about 5 weight percent of SH-containing materials, in other non-limiting embodiments contain less than about 2 weight percent of SH-containing materials, and in other non-limiting embodiments are free of SH-containing materials.

In some non-limiting embodiments, the polyol having at least 18 carbon atoms can have a number average molecular weight of about 200 to about 5,000 grams/mole, or about 200 to about 4,000 grams/mole, or at least about 200 grams/mole, or at least about 400 grams/mole, or at least about 1000 grams/mole, or at least about 2000 grams/mole. In some non-limiting embodiments, the polyol can have a number average molecular weight of less than about 5,000 grams/mole, or less than about 4,000 grams/mole, or less than about 3,000 grams/mole, or less than about 2,000 grams/mole, or less than about 1,000 grams/mole, or less than about 500 grams/mole.

Mixtures of any of the above polyols can also be used.

In some non-limiting embodiments of the polyurethanes, the reaction products can further comprise one or more of the following: polyurethane polyols, (meth)acrylamides, hydroxy(meth)acrylamides, polyvinyl alcohols, polymers containing hydroxy functional (meth)acrylates, polymers containing allyl alcohols, alkyl alcohols, polyesteramides and mixtures thereof.

In some non-limiting embodiments of the polyurethanes, the reaction products can further comprise one or more amine curing agents. The amine curing agent, if present, can act as a catalyst in the polymerization reaction, be incorporated into the resulting polymerizate and can form poly(ureaurethane)s. The amount of amine curing agent used can range from about 0.05 to about 0.9 equivalents, about 0.1 to about 0.7 equivalents, or 0.3 to about 0.5 equivalents.

Non-limiting examples of such amine curing agents include aliphatic polyamines, cycloaliphatic polyamines, aromatic polyamines and mixtures thereof. In some non-limiting embodiments, the amine curing agent can have at least two functional groups selected from primary amine (—$NH_2$), secondary amine (—NH—) and combinations thereof. In some non-limiting embodiments, the amine curing agent can have at least two primary amine groups. In some non-limiting embodiments, the amino groups are all primary groups.

In some non-limiting embodiments, the polymer precursor(s) for use in the present invention are liquid prior to polymerization.

The polymer precursor dispersion of the present invention further comprises at least one reinforcement material. The reinforcement material enhances the physical properties of polymeric foam materials created from the polymer precursor dispersion.

Suitable reinforcement materials can be formed from materials selected from polymeric inorganic materials, non-polymeric inorganic materials, polymeric organic materials, nonpolymeric organic materials, composites thereof and mixtures thereof.

As used herein, the term "polymeric inorganic material" means a polymeric material having a backbone repeat unit based on an element or elements other than carbon. See James Mark et al., *Inorganic Polymers*, Prentice Hall Polymer Science and Engineering Series, (1992) at page 5, incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon-containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761-762, and M. Silberberg, *Chemistry The Molecular Nature of Matter and Change* (1996) at page 586, which are incorporated by reference herein.

As used herein, the term "inorganic material" means any material that is not an organic material.

As used herein, the term "composite material" means a combination of two or more differing materials. For example a composite particle can be formed from a primary material that is coated, clad or encapsulated with one or more secondary materials to form a composite particle that has a softer surface. In some non-limiting embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202, incorporated by reference herein.

The reinforcing materials suitable for use in the compositions of the invention can comprise inorganic elements or compounds known in the art. Suitable nonpolymeric, inorganic reinforcing materials can be formed from ceramic materials, metallic materials, and mixtures of any of the foregoing. Nonpolymeric, inorganic materials useful in forming the reinforcing materials of the present invention comprise inorganic materials selected from the group consisting of graphite, metals, oxides, carbides, nitrides, borides, sulfides, silicates, carbonates, sulfates, and hydroxides. Suitable ceramic materials comprise metal oxides, metal nitrides, metal carbides, metal sulfides, metal silicates, metal borides, metal carbonates, and mixtures of any of the foregoing. Non-limiting examples of suitable metals include molybdenum, platinum, palladium, nickel, aluminum, copper, gold, iron, silver, alloys, and mixtures of any of the foregoing. Non-limiting examples of metal nitrides are, for example, boron nitride; non-limiting examples of metal oxides are, for example, zinc oxide; non-limiting examples of suitable metal sulfides are, for example, molybdenum disulfide, tantalum disulfide, tungsten disulfide, and zinc sulfide; non-limiting examples of metal silicates are, for example aluminum silicates and magnesium silicates such as vermiculite. In some non-limiting embodiments, the reinforcing material is essentially free of (less than 5 weight percent or less than 1 weight percent) or free of fillers such as sodium carbonate, calcium carbonate, silicates, alginates, carbon black, and metal oxides such as titanium dioxide, silica, and zinc oxide.

In some non-limiting embodiments, the reinforcing materials can comprise a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

In some non-limiting embodiments of the present invention, the reinforcing materials have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, or can be determined according to the original Mohs' hardness scale which indicates the relative scratch resistance of the surface of a material on a scale of one to ten.

In some non-limiting embodiments, the reinforcing material can be formed from a primary material that is coated, clad or encapsulated with one or more secondary materials to form a composite material that has a harder surface. In other non-limiting embodiments, reinforcement particles can be formed from a primary material that is coated, clad or encapsulated with a differing form of the primary material to form a composite material that has a harder surface.

In some non-limiting examples, inorganic particles formed from an inorganic material such as silicon carbide or aluminum nitride can be provided with a silica, carbonate or nanoclay coating to form a useful composite particle.

In some non-limiting embodiments, the reinforcing material can be glass fiber strands. The glass fiber strands are formed from glass filaments, a class of filaments generally accepted to be based upon oxide compositions such as silicates selectively modified with other oxide and non-oxide compositions. Useful glass filaments can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. As used herein, the term "fiberizable" means a material capable of being formed into a generally continuous filament, fiber, strand or yarn. As used herein, "E-glass derivatives" means glass compositions that include minor amounts of fluorine and/or boron or can be fluorine-free and/or boron-free. Furthermore, as used herein, "minor amounts of fluorine" means less than 0.5 weight percent fluorine, or less than 0.1 weight percent fluorine, and "minor amounts of boron" means less than 5 weight percent boron, or less than 2 weight percent boron. Basalt and mineral wool are examples of other fiberizable glass materials useful in the present invention. Non-limiting examples of suitable non-glass fiberizable inorganic materials include ceramic materials such as silicon carbide, carbon, quartz, graphite, mullite, aluminum oxide and piezoelectric ceramic materials. Such compositions and methods of making glass filaments therefrom are well known to those skilled in the art, such glass compositions and fiberization methods are disclosed in K. Loewenstein, *The Manufacturing Technology of Continuous Glass Fibres*, (3d Ed. 1993) at pages 30-44, 47-60, 115-122 and 126-135, incorporated by reference herein.

In some non-limiting embodiments, the reinforcing materials can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

In some non-limiting embodiments, the reinforcing materials can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing.

The reinforcing materials can also be formed from synthetic, organic polymeric materials, preferably ones that are compatible with the polymer precursor. Nonlimiting examples of suitable organic polymeric materials include, but are not limited to, thermoset materials and thermoplastic materials. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Non-limiting examples of suitable fiberizable organic materials include cotton, cellulose, natural rubber, flax, ramie, hemp, sisal and wool. Non-limiting examples of suitable fiberizable organic polymeric materials include those formed from polyamides (such as nylon and aramids such as KEVLAR™ aramid fibers), thermoplastic polyesters (such as polyethylene terephthalate and polybutylene terephthalate), polyethylenes (such as LDPEs, HDPEs, and UHMWPEs such as Honeywell SPECTRA®), acrylics (such as polyacrylonitriles), polyolefins, polyurethanes and vinyl polymers (such as polyvinyl alcohol). Non-glass fiberizable materials useful in the present invention and methods for preparing and processing such fibers are discussed at length in the *Encyclopedia of Polymer Science and Technology*, Vol. 6 (1967) at pages 505-712, which is incorporated by reference herein.

It is understood that blends or copolymers of any of the above materials and combinations of fibers formed from any of the above materials can be used in the present invention, if desired. Moreover, the term strand can encompass at least two different fibers made from differing fiberizable materials. As used herein, the term "fiberizable" means a material capable of being formed into a generally continuous filament, fiber, strand or yarn.

Suitable thermoplastic fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507-508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10, polyhexamethylene adipamide, polyamide-imides and aramids such as KEVLAR™, which is commercially available from E. I. duPont de Nemours, Inc. of Wilmington, Del. Non-limiting examples of suitable aramid fibers as reinforcement materials for polymer precursor dispersions are discussed in detail below.

Non-limiting examples of useful thermoplastic polyester fibers include those composed of polyethylene terephthalate and polybutylene terephthalate.

Non-limiting examples of useful fibers formed from acrylic polymers include polyacrylonitriles having at least about 35% by weight acrylonitrile units, or at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559-561.

Non-limiting examples of useful polyolefin fibers are generally composed of at least 85% by weight of ethylene, propylene, or other olefins. See *Encyclopedia of Polymer Science and Technology*, Vol. 6 at 561-564.

Non-limiting examples of useful fibers formed from vinyl polymers can be formed from polyvinyl chloride, polyvinylidene chloride, polytetrafluoroethylene, and polyvinyl alcohol.

Further non-limiting examples of thermoplastic fiberizable materials believed to be useful in the present invention include fiberizable polyimides, polyether sulfones, polyphenyl sulfones, polyetherketones, polyphenylene oxides, polyphenylene sulfides and polyacetals.

It is understood that blends or copolymers of any of the above materials and combinations of fibers formed from any of the above materials can be used in the present invention, if desired. Also, the thermoplastic fibers can have an antistatic agent coated thereon.

Nonlimiting examples of suitable thermoset reinforcement materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle.

The reinforcement materials are generally present in the precursor dispersion in an amount of between 0.01 and 20 wt % based on the weight of the polymer precursor, such as between 0.1 and 2.0 wt % or between 0.2 and 1.5 wt %. The reinforcement materials incorporated into the polymer precursor can have an average cross sectional diameter of from 1 to 500 nm and a volume average length of from 10 nm to 10 µm, such as from 10 nm to 4 µm, as constrained by the cell wall thickness of a cellular solid, which can be produced from the precursor dispersion and is reinforced by the reinforcement materials, as well as functionality considerations. These sizes are determined upon completion of fiber mastication as fully incorporated into the "wet" polymer precursor. ISO 13320-1:1999, Particle Size Analysis covers laser diffraction methods such as those used by Beckman Coulter N5 Submicron Particle Size Analyzer utilizing the Photon Correlation Spectroscopy technique and is based on the principles of Dynamic Light Scattering which can achieve a degree of accuracy and excellent reproducibility in the particle size range from 3 nm to 3 µm. In some non-limiting embodiments, it is desirable to size the reinforcement material relevant to desired interfacial interaction with the polymer and to allow for the materials to be optimally incorporated into the cell walls of the foamed article, providing increased enhancement of physical properties, such as mechanical strength, lower gas permeation, lower heat rescission, better resiliency, and homogeneity.

The average particle size can be determined by visually examining an electron micrograph of a scanning electron microscopy ("SEM") image, measuring the diameter of the particles in the image, and calculating the average particle size based on the magnification of the SEM image. One of ordinary skill in the art will understand how to prepare such a SEM image. In one nonlimiting embodiment of the present invention, a SEM image with submicron magnification is produced. The diameters of the particles are measured in nanometers directly by use of on-board microscopy software on a random basis. The diameter of the particle refers to the smallest diameter sphere that will completely enclose a cross section of the fiber particle normal to the length of the fiber.

It will be recognized by one skilled in the art that mixtures of one or more particles having different average particle sizes can be incorporated into the compositions in accordance with the present invention to impart the desired properties and characteristics to the compositions. For example particles of varying particle sizes can be used in the compositions according to the present invention.

The reinforcement materials are added to the polymer precursor by any appropriate mixing method. For example, conventional mixing methods such as stirring, shaking, or kneading the reinforcement materials into the polymer precursor may be used. In order to properly disperse the reinforcement materials within the polymer precursor, dispersion techniques such as grinding, milling, microfluidizing, ultrasounding, or any other dispersing techniques well known in the art can be used. Alternatively, the particles can be dispersed by any other dispersion techniques known in the art.

In one non-limiting embodiment, the reinforcement materials can be incorporated into the polymer precursor by forming them in situ. This means the reinforcement materials are formed during the same process that produces the polymer as opposed to a method in which pre-formed reinforcement materials are dispersed into a polymer precursor solution. For example, the reinforcement materials can be formed in situ by mixing a polymer precursor, such as a polyol and/or an isocyanate, with a precursor for the reinforcement material to form a mixture, forming the reinforcement materials from the precursor thereof, and forming a polymer from the precursor solution, whereby the reinforcement material is formed in the polymer matrix. The reinforcement materials are preferably formed while the viscosity of the polymer is low so that sufficient mastication of the polymer precursor solution can take place to develop the size and necessary dispersion of reinforcement materials throughout the precursor solution. The formation of the reinforcement materials can be initiated using various techniques known to those skilled in the art depending on the specific type of reinforcement material(s) selected.

In another non-limiting embodiment, the reinforcement material is a micropulp. As used herein, "micropulp" means a processed organic fiber having a volume average length ranging from 1 to 2000 micrometers, preferably 10 to 500 micrometers. Such micropulps generally have an average surface area ranging from 1 to 500 square meters per gram. In some non-limiting embodiments, the micropulp of the present invention is a fibrous organic material that includes an intermeshed combination of two or more webbed, dendritic, branched, mushroomed or fibril structures.

Micropulp can be made by contacting an organic fiber with a medium comprised of a liquid component and a solid component and then agitating the combination to size reduce and modify the organic fiber. The organic fiber used as a starting material can include pulp, short fiber, fibrids or mixtures of these forms. Through this treatment the micropulp is uniformly dispersed, masticated, and functionalized in the liquid component.

Pulps can be made by refining short fibers between rotating discs to cut and shear the fibers into smaller pieces. Pulp particles differ from short fibers by having a multitude of fibrils or tentacles extending from the body of each pulp particle. These fibrils or tentacles provide minute hair-like anchors for reinforcing composite materials and cause the pulp to have a very high surface area. A particularly useful starting material is aramid pulp, which is well known in the art and can be made by refining aramid fibers to fibrillate the short pieces of aramid fiber material. Such pulps have been reported to have a surface area in the range of 4.2 to 15 $m^2$/gram and a Kajaani weight average length in the range of 0.6 to 1.1 millimeters (mm). Such pulps have high volume average length, compared to the micropulp. For example, Style 1F543 aramid pulp available from E. I. du Pont de Nemours and Company has a Kajaani weight average length in the range of 0.6 to 0.8 mm, and when laser defraction is used to measure this pulp the volume average length is 500 to 600 micrometers (0.5 to 0.6 mm). An alternate method of making aramid pulp directly from a polymerizing solution is disclosed in U.S. Pat. No. 5,028,372, incorporated herein by reference.

Short fiber (sometimes called floc) is made by cutting continuous filament into short lengths without significantly fibrillating the fiber. Short fiber length typically ranges from about 0.25 mm to 12 mm. Short fibers suitable for use in the present invention are the reinforcing fibers disclosed in U.S. Pat. No. 5,474,842, incorporated herein by reference.

Fibrids are non-granular film-like particles having an average maximum length or dimension in the range of 0.2 to 1 mm with a length-to-width aspect ratio in the range of 5:1 to 10:1. The thickness dimension is on the order of a fraction of a micron. Aramid fibrids are well known in the art and can be made in accordance with the processes disclosed in U.S. Pat. Nos. 5,209,877, 5,026,456, 3,018,091 and 2,999,788, each of which is incorporated herein by reference. The processes typically include adding a solution of organic polymer in solvent to another liquid, that is a non-solvent for the polymer but is miscible with the solvent, and applying vigorous agitation to cause coagulation of fibrids. The coagulated fibrids are wet milled, separated, and dried to yield clumps of fibrids having a high surface area; the clumps are then opened to yield a particulate fibrid product.

Micropulp used in the present invention can be made from an organic fiber comprised of aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, or a mixture thereof. Especially useful polymers are made from aromatic polyamides, polybenzoxadiazole, polybenzimidazole, or a mixture thereof. Other organic fibers suitable for use in the present invention include natural fibers, such as cellulose, cotton, silk, and/or wool fibers.

Some commercially available fibers useful as a starting material for micropulp include ZYLON® PBO-AS (poly(p-phenylene-2,6-benzobisoxazole)) fiber, ZYLON® PBO-HM (poly(p-phenylene-2,6-benzobisoxazole)) fiber, DYNEEMA® SK60 and SK71 ultra high strength polyethylene fiber, all supplied by Toyobo, Japan; Celanese VECTRAN® HS pulp, EFT 1063-178, supplied by Engineering Fibers Technology, Shelton, Conn.; CFF Fibrillated Acrylic Fiber supplied by Sterling Fibers, Inc., Pace, Fla.; and Tiara Aramid KY-400S Pulp supplied by Daicel Chemical Industries, Ltd., 1 Teppo-Cho, Sakai City Japan.

Other available organic fibers comprise fibers made from the aromatic polyamide polymers poly(p-phenylene terephthalamide) and/or poly(m-phenylene isophthalamide). Such fibers are also known as aramid fibers. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Such organic fibers are disclosed in U.S. Pat. Nos. 3,869,430; 3,869,429; 3,767,756; and 2,999,788, each of which is incorporated herein by reference. Preferred aromatic polyamide organic fibers are known under the trademark KEVLAR™ fibers, KEVLAR™ aramid pulp, style 1F543; 1.5 mm KEVLAR™ aramid floc style 6F561; and NOMEX™ aramid fibrids style F25W. All of these are available from E. I. du Pont de Nemours and Company, Wilmington, Del.

Incorporating a micropulp into a polymer precursor is generally accomplished through a contacting step, an agitating step, and optionally a removing step. The contacting step comprises contacting organic fiber, a polymer precursor and a solid component. The agitating step comprises agitating the organic fiber, the polymer precursor, and the solid component to transform the organic fiber into a micropulp having a volume average length of from 0.01 to 100 micrometers dispersed in the polymer precursor. The optional removing step comprises optionally removing the solid component.

Micropulp can be made in the polymer precursor. Such polymer precursors, if liquid at normal temperatures, can be used neat without solvent. However, if the polymer precursor is solid, or too viscous, the polymer precursor can be solutioned in a solvent and used in that fashion. If the polymer precursor is used without solvent, it is preferred the micropulp be present in an amount of 0.01 to 20 wt %, based on the total weight of the polymer precursor and micropulp. If a solvent is added to the polymer precursor, the preferred amount of organic fiber present is 0.01 to 20 wt % based on the total amount of polymer precursor, fiber, and solvent present. However, a concentrated polymer precursor can be made by removing all or a portion of the solvent from the dispersion after the micropulp is formed. In this manner a polymer precursor having concentrations of 50 wt % micropulp or higher can be formed.

In the presence of a polymer precursor, the micropulp can be processed so as to have a volume average length ranging from 0.01 micrometers to 100 micrometers and an average surface area of from 25 to 900, such as from 25 to 500, square meters per gram. Such processing can result in a "nanopulp" material, having dimensions smaller in magnitude than the micropulps described above. This is accomplished by contacting and agitating the organic fibers with a liquid polymer precursor and a solid component. Agitating the organic fibers in the presence of solid components size-reduce and modify the organic fibers. The organic fibers repeatedly come in contact with and are masticated by the solid components maintained in an agitated state by, for example, one or more stirring arms of an attritor. Unlike the conventional grinding or chopping processes that tend to largely reduce only fiber length, albeit with some increase in surface area and fibrillation, the size reduction in the process of this invention results from both longitudinal separation of the organic fibers into substantially smaller diameter fibers along with a length reduction. Average fiber length reductions of one, two or even greater orders of magnitude can be attained. The agitating step is continued for sufficient duration to transform the organic fibers into a micropulp or nanopulp of the appropriate size. Moreover, it may be desirable to incrementally transform the organic fiber into a nanopulp in several passes by repeatedly passing the medium containing the organic fibers through the agitation device.

When the polymer precursor dispersion containing nanopulp is made by agitating a solid component and a liquid polymer precursor or polymer precursor solution, the surface of the beginning micropulp is fully wetted and uniformly distributed in the dispersion, with minimal agglomerations or clumps.

The processing of organic fibers/micropulp into nanopulp can be accomplished in any one or more types of agitating devices, including an attritor or a mill, and the devices can be batch or continuously operated. Batch attritors are known in the art and those such as attritor models 01, 1-S, 10-S, 15-S, 30-S, 100-S and 200-S supplied by Union Process, Inc., of Akron, Ohio are well suited for the process of the present invention. Another supplier of such devices is Glen Mills Inc. of Clifton, N.J. Media mills are supplied by Premier Mills, Reading Pa., and some of their suitable mills include the Supermill HM and EBP models. CMC, Inc. has developed a ball mill to attain higher levels of viscous processing and better protection from contamination through advanced seals.

The preferred agitation device is an attritor, and preferably the solid component is poured into the agitation chamber of the attritor and then agitated by the stirring arms, after which the premix of organic fibers and liquid component is then poured into the chamber. To accelerate the rate of transformation, the solid component is circulated during the agitating step through an external passage that is typically connected near the bottom and the top of the chamber for a vertical media mill. The rate at which the solid component is agitated depends upon the physical and chemical make-up of the organic fibers being transformed, the size and type of the solid component, the duration of the transformation, as well as the size of the nanopulp desired. The agitation of the solid component in an attritor is generally controlled by the tip speed of the stirring arms and the number of stirring arms provided. A typical attritor has four to twelve arms and the tip speed of the stirring arms generally range from about 150 fpm to about 1200 fpm (about 45 meters per minute to about 366 meters per minute). The preferred attritor has six arms and is operated at a tip speed in the range of about 200 fpm to about 1000 fpm (about 61 meters per minute to about 305 meters per minute) and more preferably from about 300 fpm to about 500 fpm (about 91 meters per minute to about 152 meters per minute). If a media mill is used, the tip speeds of the stirring arms generally range from about 1500 fpm to about 3500 fpm (about 457 meters per minute to about 1067 meters per minute) and preferably from about 2000 fpm to about 3000 fpm (about 610 meters per minute to about 914 meters per minute). Any excessive heat generated in the agitation process is normally removed by use of a cooling jacket on the agitation chamber.

The amount of solid component used in the agitating chamber is called the load, and is measured by the bulk volume and not the actual volume of the agitating chamber. Thus, 100% load means about 60% of the chamber volume since substantial air pockets exist within the solid component. The load for the media mill or an attritor ranges from 40% to 90%, preferably from 75% to 90% based on the full load. The load for the ball mill ranges from 30% to 60% based on the full load. In practice, the percent load is determined by first totally filling the chamber with the solid component to determine the weight of a full load. The desired load is then measured by weight as a percent of the full load.

After the organic fiber/micropulp is transformed into a nanopulp, normally the solid component is removed to form a dispersion of the nanopulp in the polymer precursor. Typically the solid component remains in the agitating chamber. However, if needed, some of the conventional separation processes include a mesh screen having openings that are small enough for the precursor dispersion containing the nanopulp to pass through while the solid component is retained on the mesh screen. Thereafter, the dispersion can be used directly. Typically, the dispersion of the preferred nanopulp, when visually observed on a 254 microns (10 mils) draw-down on a glass, contains negligible grit or seed.

In one non-limiting embodiment, the reinforcement material is incorporated into a polyol prior to subsequent processing. While not wishing to be bound to a particular theory, it is believed that processing the reinforcement material in a polyol provides advantages such as increased pot life as compared to when solvent or water is used. In instances where a polymeric foam article is produced by combining multiple polymer precursors, the reinforcing material can be incorporated into one or both of the polymer precursors to create multiple precursor dispersions.

Other additives such as catalysts, blowing agents, and surfactants can also be incorporated into the precursor dispersion either before or after addition of the reinforcement material. In some embodiments, these additives can also be added after the precursor dispersion has been formed, including during polymerization.

Any conventional blowing agent can be used. Non-limiting examples of suitable blowing agents include, for example, low boiling halohydrocarbons; those that generate carbon dioxide; blowing agents that are solid at room temperature and that when heated to temperatures higher than their decomposition temperature, generate gases such as nitrogen, carbon dioxide, ammonia gas or the like, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Water or water-based solutions can also be used as blowing agents.

Once formed, the precursor dispersion can then be reacted, polymerized or otherwise processed to create a solid, foamable polymer.

Polymerization can be carried out using a variety of techniques, including those conventional step-growth and chain-growth polymerization techniques known in the art.

The method of polymerization depends primarily on the particular polymer precursor(s) present in the polymerizable solution.

In one non-limiting example polymerization can be completed by reacting the polymer dispersion and other polymer precursor(s) together in a one-pot process. Such example is particularly applicable to form polyurethanes.

Polymerization can also be carried out by first creating a prepolymer of one or more of the polymer precursor compounds and then introducing other reactants, such as diols, and optional catalysts.

In the "one shot" or bulk polymerization method, all of the ingredients, that is, the precursor dispersion, other polymer precursors, and optional additives are mixed simultaneously. This method is generally satisfactory when all active hydrogens react at about the same rate such as when all contain hydroxyl groups as the only reactive sites.

In some non-limiting embodiments, various additives can be included with the polymer precursors so as to become part of the final polymer. Such additives include light stabilizers, heat stabilizers, antioxidants, colorants, fire retardants, ultraviolet light absorbers, light stabilizers such as hindered amine light stabilizers, mold release agents, static (non-photochromic) dyes, fluorescent agents, pigments, surfactants, flexibilizing additives, such as but not limited to alkoxylated phenol benzoates and poly(alkylene glycol) dibenzoates, and mixtures thereof. Examples of useful antioxidants include IRGANOX 1010, IRGANOX 1076, and IRGANOX MD 1024, each commercially available from Ciba Specialty Chemicals of Tarrytown, N.Y. Examples of useful UV absorbers include CYASORB UV 5411, TINUVIN 130 and TINUVIN 328 commercially available Ciba Specialty Chemicals, and SANDOVAR 3206 commercially available from Clariant Corp. of Charlotte, N.C. Examples of useful hindered amine light stabilizers include SANDOVAR 3056 commercially available from Clariant Corp. of Charlotte, N.C. Examples of useful surfactants include BYK 306 commercially available from BYK Chemie of Wesel, Germany.

In some non-limiting embodiments, suitable catalysts can be a stannous salt of an organic acid, such as stannous octoate or butyl stannoic acid. Other non-limiting examples of suitable catalysts include tertiary amine catalysts, tertiary ammonium salts, tin catalysts, phosphines or mixtures thereof. In some non-limiting embodiments, the catalysts can be dimethyl cyclohexylamine, dibutyl tin dilaurate, dibutyltin diacetate, dibutyltin mercaptide, dibutyltin diacetate, dibutyl tin dimaleate, dimethyl tin diacetate, dimethyl tin dilaurate, 1,4-diazabicyclo[2.2.2]octane, bismuth carboxylates, zirconium carboxylates, zinc octoate, ferric acetylacetonate and mixtures thereof. The amount of catalyst used can vary depending on the amount of components, for example about 10 ppm to about 600 ppm.

Such additives can be present in an amount such that the additive constitutes less than about 30 percent by weight, or less than about 15 percent by weight, or less than about 5 percent by weight, or less than about 3 percent by weight, based on the total weight of the polymer.

The final polymeric foam material can be produced by, for example, manual spray, automated spray, extrusion, blending/heating, solvent flash, bead mold, thermoforming, injection molding, continuous horizontal foaming, foam sheets and batch processing.

In some non-limiting embodiments, the chosen polymeric foam and its polymer precursors are first analyzed for their compatibility with various reinforcement materials available to be milled in-situ with one or more of the polymer precursors. The chemistry, foaming rheology and final cellular structure are examined to determine which fiber during mastication in a closed ball milling process will react with the raw material to increase functionality (or add moeities), maintain appropriate physical characteristics (e.g., size, viscosity, density), effectively disperse the desired properties and maintain those desired original characteristics of the foam system.

In some non-limiting embodiments, the chosen reinforcement material is tested for compatibility, functionality and dispersion characteristics in a batch mode. This test can be a compatibility test utilizing a high speed mixer and samples of the reinforcement material to ascertain their mutual solubility. For example, a compatibility test resulted in the selection of a water blown polyol and a "partially hydrophilic" pulp for ball milling in a sealed environment to enhance the functionality of the final milled polyol Alternately, the pulp was found to be compatible with the isocyanate (MDI) of the proposed system and higher concentrations of fiber could be introduced into the final product while maintaining reasonable viscosities necessary in the manufacturing phase. Further, the addition of reinforcement materials to both polymer precursors of a two part foam system would enhance the properties of the final cellular solid by additional cross linking functionalities and a higher overall fiber concentration and surface dispersion throughout the material.

In some non-limiting embodiments, the fiber can be ball milled in a closed media mill capable of high viscosity milling to size conditions driven by cell wall size of the final product, areal surface requirements and post milling manufacturing rheology factors. A range of milling efforts is necessary to establish estimation curves for subsequent customization of strength values, thermal properties, resilience and other key design material characteristics. The development of these individual material algorithms for each foam system based on fiber, any additives, milling time and environmental processing requirements establishes the scalable processes necessary to consistently produce materials of the desired characteristics. In this fashion, each cellular solid or foam system that is "designed" by these methods can rely on a relatively stable chemistry and process while varying a much more predictable fiber content for various desired material properties.

The following examples are presented to demonstrate the general principles of the invention. The invention should not be considered limited to the specific examples presented. All parts are by weight unless otherwise indicated.

EXAMPLES

The examples are directed to a process for incorporating micropulp reinforcement materials in the cell walls of urethane foams (e.g., polyurethane, polyisocyanurate foams). The cell wall thickness of typical rigid polyurethane foam is from 3 μm where two cells intersect to 30 μm where multiple cells intersect. One article produced from this foam formulation process is a sprayed, two-part polyisocyanurate or polyurethane foam with aramid nano-pulp optimally dispersed (e.g., minimum fiber content producing complete interfacial enhancements) throughout the cell wall thickness only. Also, it is desirable that the "inert" aramid fibers combine with the chemical structure of either the polyol or isocyanate to form a higher functional material even if only partially. The resultant foam structure will provide better aging qualities, increased strength characteristics and enhanced thermal properties consistent with aramid's superior mechanical reinforcement properties, higher functionality of the raw materials and a full range of temperatures from cryogenic to 500° C.

A commercial marine product supplied by North Carolina Foam Industries (NCFI) was selected for processing. NCFI 15-010, available commercially from NCFI, is a water based foam system largely used in the marine industries. NCFI 15-010 is a two component, water blown, all PMDI-based spray polyurethane foam system designed for use as a void fill, insulation material or flotation material. NCFI 15-010 has been formulated to spray at 2.8-3.0 pcf depending on lift thickness. The system was selected primarily for two reasons: 1) the polyol resin's low viscosity rating of 500 cps and 2) its environmentally friendly water blown make-up.

Upon completion of fiber compatibility and optimization studies, Kevlar™ Pulp #1F543, available commercially from Du Pont, was chosen to be ball milled in a ceramic media mixer. The pulp was milled within the polyol at a concentration of 1 wt % based on the total weight of the polyol and pulp, essentially limiting its concentration in the final foam to about 0.5 wt % once isocyanate is added in an appropriate ratio with the polyol dispersion (which can be approximated as a 1:1 ratio by volume but can vary depending on the functionality and molecular weight of the polyol and isocyanate). The milling was conducted under a nitrogen purge on the system for control of contamination to the process. The following are the results of two different sample sets described in Tables 1 and 2, respectively. The fiber lengths recorded in Tables 1 and 2 are post-processing lengths, with the fibers fully integrated and dispersed in the raw polyol. In Table 2, the Final Water Content represents the final amount of water in the polyol dispersion once DI water was added to normalize all samples to a common water target value.

TABLE 1

Fiber Rich Polyol Samples

| SAMPLE | KEVLAR ® (wt %) | MEAN FIBER LENGTH (μm) | MEDIAN FIBER LENGTH (μm) | WATER (%) |
|---|---|---|---|---|
| POLYOL RESIN | | | | 3.63 |
| II-1 | 1 | 6.2 | 10 | 2.15 |
| II-2 | 1 | 2.93 | 4.64 | 1.33 |
| II-3 | 1 | 0.76 | 1.69 | 1.08 |
| II-4 | 1 | 0.5 | 0.5 | 0.9 |
| II-5 | 1 | 0.26 | 0.26 | 0.76 |

TABLE 2

Fiber Rich Polyol Samples

| SAMPLE | KEVLAR ® (wt %) | WATER (% of total) | FINAL WATER CONTENT* (% in polyol) | FIBER LENGTH (μm) MEAN | FIBER LENGTH (μm) MEDIAN |
|---|---|---|---|---|---|
| POLYOL | | 3.60 | | | |
| IV-1 | 1 | 1.77 | 3.70 | 4.54 | 8.16 |
| IV-2 | 1 | 1.16 | 3.75 | 1.69 | 2.80 |
| IV-3 | 1 | 0.92 | 3.66 | 0.72 | 0.31 |

*DI water added to get to this level

After milling, four sets of various fiber length samples (II-1, 2, 3 & 5) were sent for foam sample production and mechanical testing.

Figure 2:
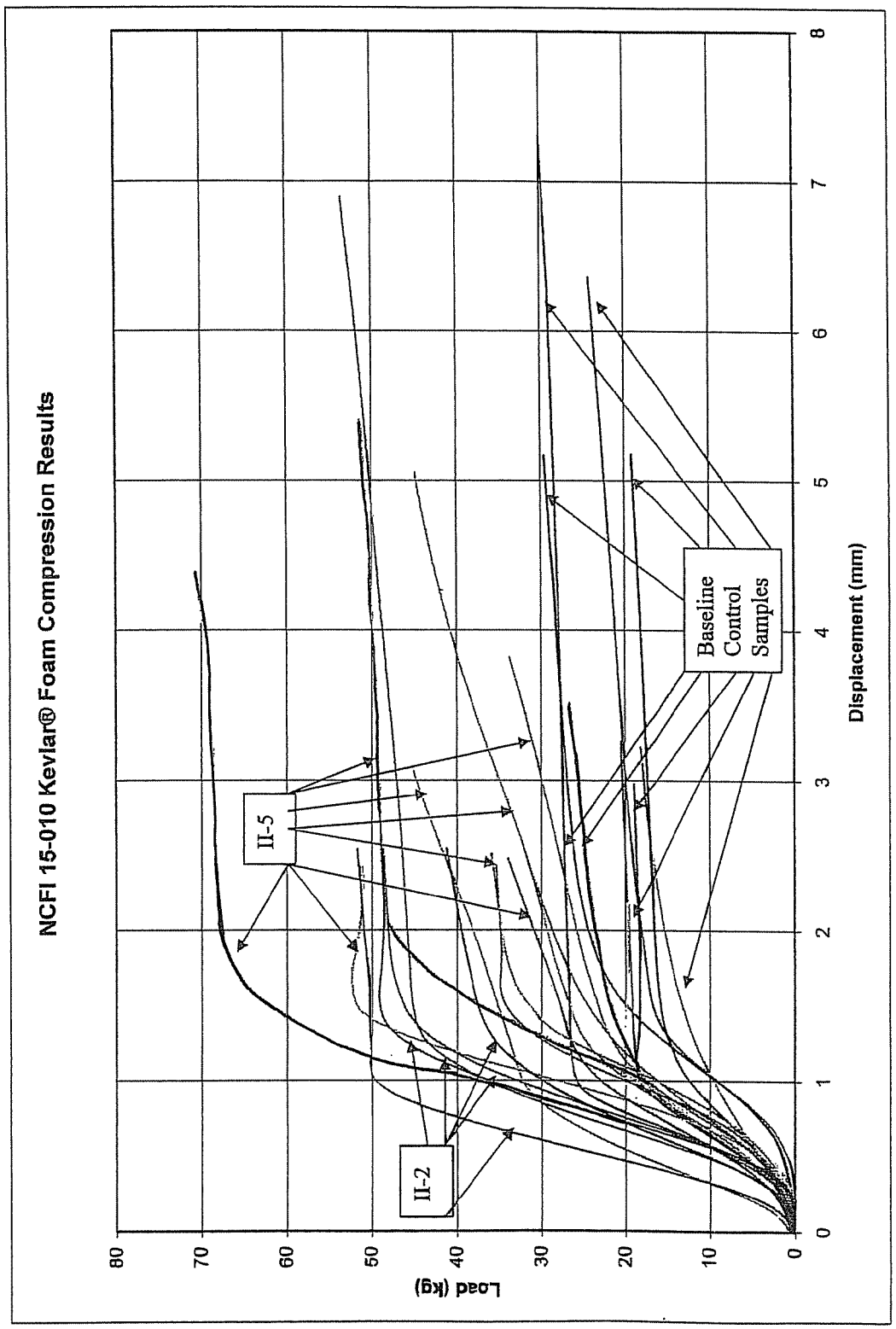
FIG. 2 is a graphical depiction showing the results of compression testing for the samples tested in FIG. 1.

It was discovered that an adjustment for moisture content was necessary due to fiber uptake during milling to avoid affecting the selected blowing agent and resultant bubble nucleation process. High-frequency spectroscopy can be used to determine the moisture level in the samples and help determine the necessary adjustments that must be made. This adjustment was made for both sets of samples. Sample production for the first set of samples was performed manually using large "popcorn cups" and a paddle wheel mixer on a drill. Pours into aluminum molds were for the most part unsuccessful due to the quick rise time of the foam system. However, a sufficient number of ~50×50×25 mm samples were cut from cup molds to be able to conduct several tension and compression tests. The results of tensile tests are shown in FIG. 1 and compression results in FIG. 2. In FIG. 1, the steep curves represent the fiber reinforced foam samples. In FIG. 2, applied test load is shown rather than stress concentration because all samples have consistent cross sectional areas. Mechanical testing was conducted according to known methodology, including ASTM D1621-04a (Standard Test Method for Compressive Properties of Rigid Cellular Plastics) and ASTM D1623-03 (Standard Test Method for Tensile & Tensile Adhesion Properties of Rigid Cellular Plastics).

The average calculated tensile strength of fiber samples was ~139% of the baseline control samples and the average compression results of fiber samples were about ~178% of the baseline control samples for the II-1, II-2, II-3 and II-5 sample series. The baseline control sample tensile and compression values represent the respective values of foam samples that have the same polymer formulation but do not have an added reinforcement material.

Figure 3:
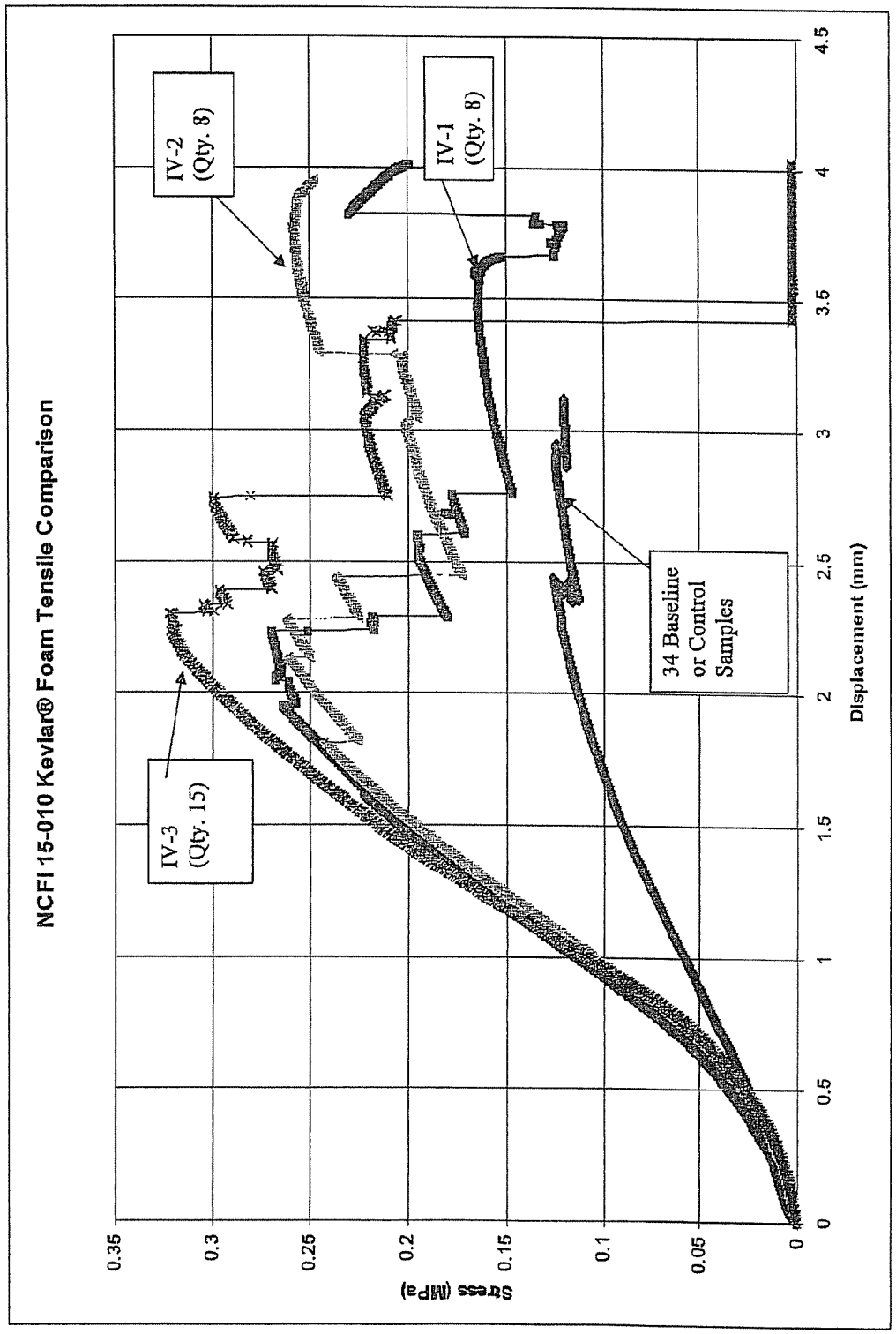
FIG. 3 is a graphical depiction showing the results of tensile strength testing of a second set of samples according to the present invention.
Figure 4:
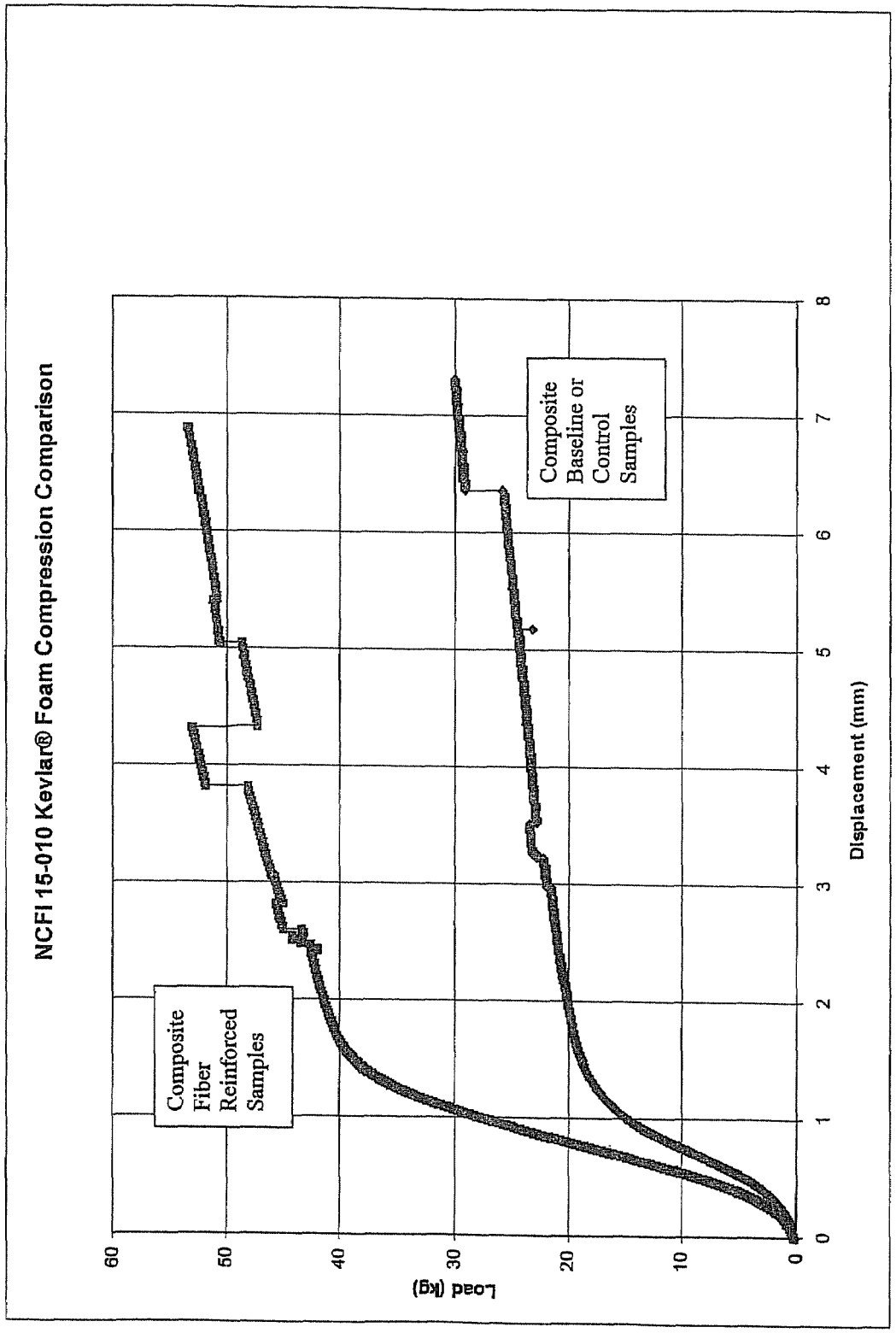
FIG. 4 is a graphical depiction showing the results of compression testing for the samples tested in FIG. 3.

Another batch of NCFI 15-010 were milled resulting in the production of three sets of various fiber length samples (IV-1 through 3 in Table 2) that were processed and tested. An Ashby Cross Company, Inc. Model #1125 VR foam dispensing machine was used for foam sample production. This single action machine with variable ratio meters mixes and dispenses a wide range of two-part reactive resins. Several tests were conducted upon receipt of materials to assure that the isocyanate index (weight of isocyanate to weight of resin) was within the specified range of the baseline NCFI 15-010 foam system. Between batches of materials the lines were purged with "dump shots" to insure homogeneity of the raw materials. A rise test was performed prior to each sample mold shot as a witness sample for isocyanate index, density consistency and post test checking. "Rise" and "rate of rise" (which is time dependent) directly provide an indication of the reactivity of the raw materials and the bubble nucleation process. All batches proved to be within fractional ranges of the ~4.7 liter yield from the baseline NCFI 15-010. Yield represents a volumetric measure of the final product and provides a cumulative indication of the final product's average cell size, density, cell wall thickness and bubble nucleation characteristics. Yield provides a way in which a laboratory technician can check for "equivalency" in these characteristics, though individually these characteristics could still vary. Two kinds of test samples were produced; 1) a 50 mm diameter cylindrical sample, and 2) a rectangular sample. The cylindrical samples were the easiest to mount to the test blocks exhibiting very smooth, straight surfaces with only minor "rind" on the perimeter in most cases. Rind is an undesirable product that occurs in most foam product applications and defeats the purpose of a foam product in providing low densities and lower overall weight. It should be noted that "rind" is an area of high density typically found in most sprayed or poured foams at the interface with a large "heat sink" such as air, the wall of a mold or other areas wherein the foam fails to reach temperatures high enough for the blowing agent to create the correct bubble nucleation results. Samples exhibiting heavy "rind" were not utilized in calculation of the results. The samples were tested on a Mecmesin Model 5-i desktop mechanical test machine. The composite tensile results of these tests are shown in FIG. 3 and the overall composite compression in FIG. 4. On average, the IV-3 samples exhibited 200% of baseline tensile results, the IV-2 sample exhibited 181% of baseline tensile results and the IV-1 sample exhibited 179% of baseline tensile results. The overall samples composite for compression reveals a predicted yield value of 215% of the baseline value.

The Ashby Cross dispensing machine was calibrated specifically for the NCFI 15-010 foam system to meter precisely a 1:1 ratio by volume (rbv) or 1.18+/−0.01 rbw (isocyanate index). These ratios were not only verified by the manufacturer, but validated in the lab with multiple dump shot tests. Witness samples and "rise" test proofs were established for fiber rich and baseline materials. The extensive mixing afforded by the Ashby Cross air motor shaft driven dynamic blades within the disposable mixer heads allows for an almost exact volumetric match in the "rise" proof tests. The positive displacement pumps and pressure fed reservoir feed system prove that the viscous fiber rich polyols can be easily delivered to a spray head @ only 4.14 bar. Also, final foam densities as low as 0.032 Mg/m$^3$ (~2 lb/ft$^3$) were produced with these viscous polyols. Interestingly, no good correlation could be made between strength and density or isocyanate index for the fiber rich or baseline materials. However, presence of high density "rind" revealed a two-fold increase in tensile strength as opposed to an adjacent rind removed sample. Directionality and orientation to rise direction of samples has a strong influence on results as does batch lot of materials. These parameters were kept under good control with statistically significant sample sizes, close monitoring of sample production and repetitive calendar attempts. Results were relatively consistent and within the family of the range of values commonly witnessed for the baseline materials.

Figure 5:
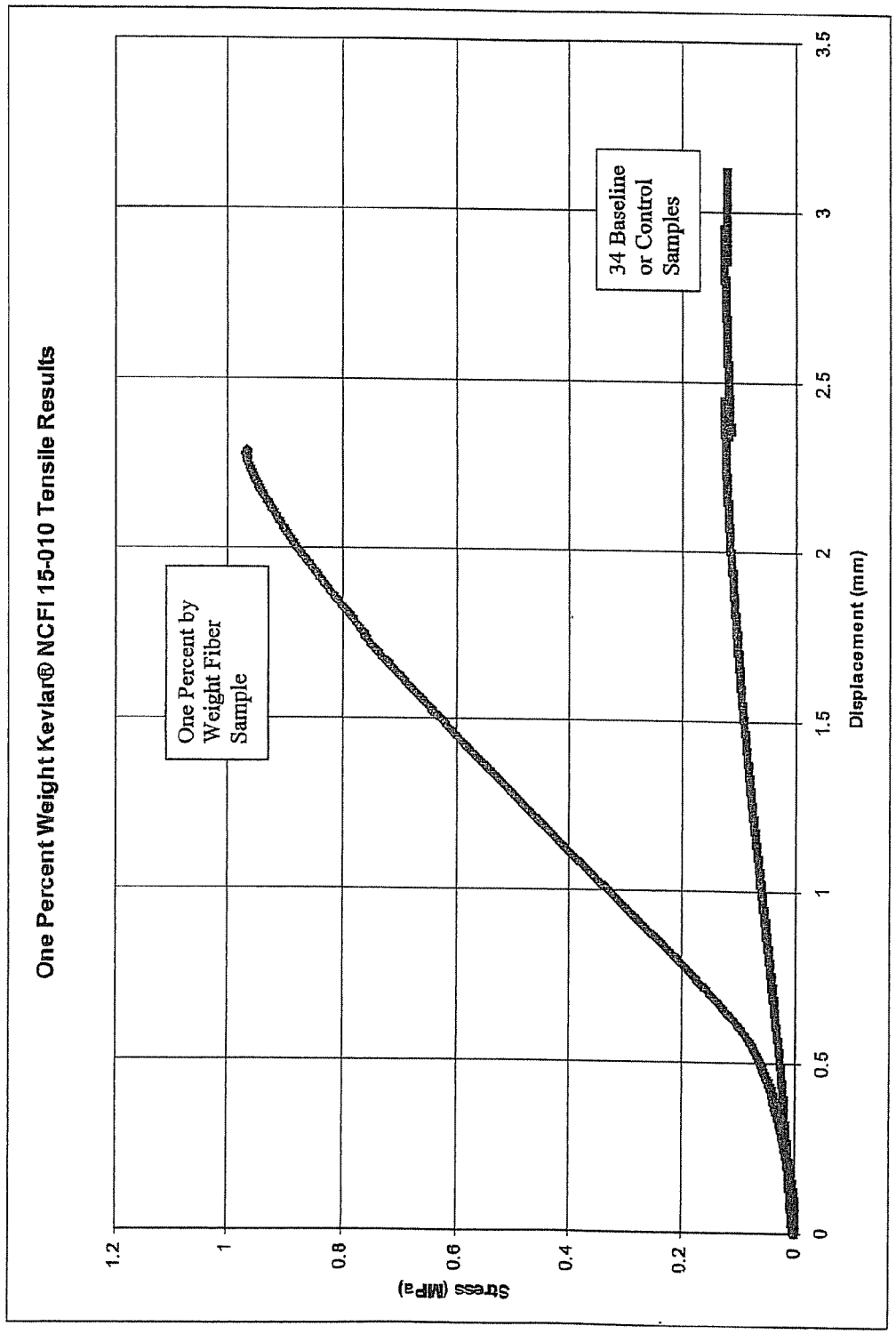
FIG. 5 is a graphical depiction showing the results of tensile strength testing on a 1 wt % Kevlar® sample.

One sample of the fiber rich foam, a "combined" mixture trial, was crushed inadvertently during testing to a 431 kg compressive load essentially flattening the sample. However, the tensile test was continued anyway to realize a maximum tensile stress of 0.41 MPa. Also, a ~1% by weight sample was produced and tested with results shown in FIG. 5.

At this concentration, the tensile results are 5-6× the average baseline value. Also, visual results of preliminary oven testing at 200° C. has shown that the fiber rich foam exhibits less char and less rescission than the baseline material. This was expected and is consistent with previously published data on erosion rates of hypalon/kevlar fiber insulation.

Figure 6:
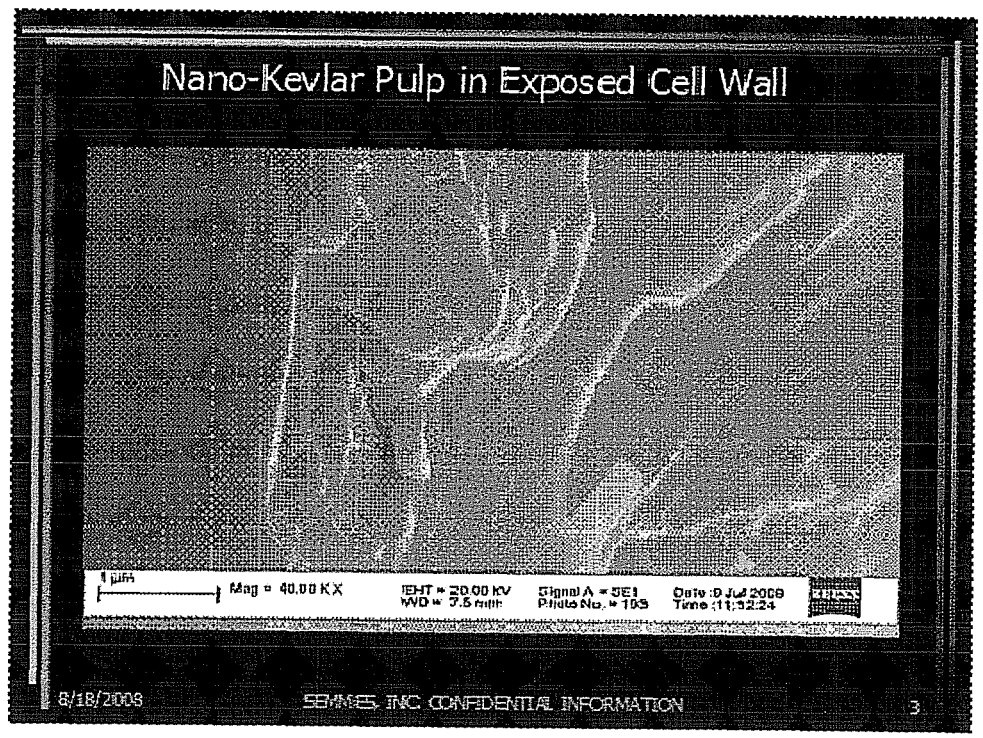
FIG. 6 is an SEM photograph of a foam polyurethane with aramid Kevlar® fibers embedded therein.

FIG. 6 shows an SEM photograph of a finished foam polyurethane product with aramid Kevlar® fibers incorporated therein. It reveals the fractured face of a cell wall in the finished product (note the visibly evident "sheared" fiber within the cell wall). This photo also reveals the manner in which the fibers have been fully dispersed and integrated within the construct of the foam cell walls.

The above described test results clearly indicate the advantages of incorporating reinforcement materials, such as aramid fibers, into a polymer foam system. The addition of only ~0.5 wt % Kevlar™ results in an approximate two-fold increase in tensile and compressive strength without sacrificing density, thermal conductivity, processability or any other key parameters. The addition of ~1.0 wt % is even more dramatic as shown by the test data. The commercial uses are unlimited and may even prove to provide safer bedding materials in flexible (non-rigid) foam systems.

The introduction of reinforcement materials into polymer foams can improve various material properties. Micro- or nano-sized aramid fibers successfully introduced into the cell walls of the urethane, for example, create a higher strength cell structure resulting in the capability to "bridge" areas weakened by variable spray application processes, materials composition and environmental factors. Many different reinforcement materials of various types and sizes, as well as different mixing techniques and reinforcement material content can be optimized to realize the best reinforcement combination.

The present invention has been described with reference to specific details of particular embodiments thereof. It is not intended that such details be regarded as limitations upon the scope of the invention except insofar as and to the extent that they are included in the accompanying claims.

What is claimed is:

1. A method of making a reinforced cellular foamed article, comprising the steps of:
    forming a mixture of a precursor for a foamable polymer and a precursor for forming a polymeric reinforcement fiber material;
    forming the polymeric reinforcement fiber material in situ in the presence of the precursor for the foamable polymer, thereby preparing a dispersion comprising the polymeric reinforcement fiber material and the precursor for the foamable polymer;
    processing the polymeric reinforcement fiber material in the presence of the precursor for the foamable polymer so that the polymeric reinforcement fiber material has an average cross sectional diameter of from about 1 to about 500 nm and a volume average length of from about 10 nm to about 10 µm;
    reacting the precursor for the foamable polymer to form a foamable polymer; and
    foaming the foamable polymer.

* * * * *